United States Patent
Kawamura

(10) Patent No.: US 7,338,373 B2
(45) Date of Patent: Mar. 4, 2008

(54) METHOD AND APPARATUS FOR GENERATING SOUNDS IN A VIDEO GAME

(75) Inventor: Masafumi Kawamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 859 days.

(21) Appl. No.: 10/726,890

(22) Filed: Dec. 4, 2003

(65) Prior Publication Data

US 2004/0110561 A1 Jun. 10, 2004

(30) Foreign Application Priority Data

Dec. 4, 2002 (JP) ............................. 2002-352169

(51) Int. Cl.
*A63F 13/00* (2006.01)
(52) U.S. Cl. ...................................... 463/35
(58) Field of Classification Search .................. 463/35
See application file for complete search history.

(56) References Cited

U.S. PATENT DOCUMENTS

| | | | | |
|---|---|---|---|---|
| 5,026,051 A | * | 6/1991 | Lowe et al. ................ | 463/35 |
| 5,768,393 A | * | 6/1998 | Mukojima et al. ......... | 381/17 |
| 5,862,229 A | * | 1/1999 | Shimizu ..................... | 381/17 |
| 5,993,318 A | * | 11/1999 | Kousaki ..................... | 463/35 |
| 6,361,439 B1 | * | 3/2002 | Kawamoto .................. | 463/35 |

FOREIGN PATENT DOCUMENTS

| | | |
|---|---|---|
| JP | 2000-013900 | 1/2000 |
| JP | 2001-252467 | 9/2001 |
| JP | 2002-085831 | 3/2002 |
| JP | 2002-199498 | 7/2002 |
| JP | 2003-190624 | 7/2003 |

* cited by examiner

*Primary Examiner*—Scott E. Jones
(74) *Attorney, Agent, or Firm*—Nixon & Vanderhye P.C.

(57) ABSTRACT

A video game apparatus includes a CPU that generates a game screen that depicts player character movement while a game is being played. In addition, the CPU controls the production of sounds that seem to eminate from one or more sound objects displayed on the game screen. When a plurality of the sound objects of the same kind exist on the game screen, the CPU computes sound volume data of the sounds produced by the respective sound objects and divides the computed sound volume data into components of right sound volume data, left sound volume data, and surround sound volume data. Using respective sound components from all the displayed sound objects, the maximum components are extracted and localization data and sound volume data are computed. Based on the computed localization data and sound volume data, the composite sound of a sound object is output.

17 Claims, 14 Drawing Sheets

METHOD AND APPARATUS FOR GENERATING SOUNDS IN A VIDEO GAME

BACKGROUND OF THE INVENTION

1. Field of the Invention

The illustrative exemplary non-limiting implementations disclosed herein generally relate to a game apparatus capable of displaying game objects and producing sounds associated with a plurality of sound generating objects and a method for generating sounds. More specifically, the exemplary implementations disclosed herein relate to a video-graphics gaming method and apparatus, the game apparatus being provided with a mechanism for inputting game operating information and for advancing game play action according to an operation of a controller, and method for displaying a game screen including two or more sound generating game objects, producing sounds associated with the game objects, and a storage medium that stores game sound data and program instructions for generating game object sounds.

2. Description of the Prior Art

Generally, in a game played in a virtual 3D (three-dimensional) space, in a situation where a virtual sound generating object such as, for example, a torch that produces a burning sound when a game character (e.g., a displayed character controlled by a human player) approaches the sound generating object, a process is implemented whereby the burning sound of the torch becomes louder. At this time, if a plurality of torches exist around the game character (in the three-dimensional game space), a plurality of sound generation sources equal to the number of torches around the game character are needed to produce burning sounds of all of the torches. However, in the situation where the number of sound sources that needs to be produced exceeds a maximum number of the sounds capable of being generated simultaneously by the game processor, then the total number of sounds needing to be produced is reduced by purposefully not generating sounds from one or more of the sound generating objects, which may be prioritized, for example, according to the virtual 3D distance from the game character.

Furthermore, in such a game, if the torch exists, for example, at a front oblique right position on the display screen, in order that it is processed as if the sound of the torch were heard from the oblique right, a right volume component of the sound source is increased and a left volume component is decreased. In addition, if the game processor is capable of processing a surround sound component, it is possible to implement a sound generation process in such a manner that generated sounds may be heard as though originating from behind the human operator/player and, thus, the operator/player is "surrounded" by the so generate sounds.

One example of the prior art is disclosed in, for example, Japanese Patent Laying-open No. 2000-13900 [International classification:H04S 7/00, G10K 15/00] laid-open on Jan. 14, 2000. In a sound reproducing apparatus of this prior art, it is assumed that a position of the head of a listener is the origin and, accordingly, all the arranged sound objects are divided into several groups by a rotating axis that rotates about an axis extending toward a front side of the listener by a predetermined degree, and a sound of one or a plurality of sound object(s) included in each group is generated by using only a single sound producing source.

In a case where the total number of activated sound sources is reduced by assigning a distance based priority scheme, as in the former example, there may be a problem that a sound that is not so important, but rather is to be heard as an ambient sound within a predetermined sound field (virtual three-dimensional space), that sound may become muted. If that happens, a certain liveliness of the game is lost. Furthermore, during game play, when, for example, torches exist on both the right and the left of the game character, if only the sound of the right torch is muted, it feels somewhat strange that only the burning sound from the left torch is heard, irrespective of the existence of both right and left torches.

In addition, in the latter example, in order to determine a direction for dividing the plurality of sound objects, it is necessary to evaluate the angle toward a location or position at which the sounds are to be collected for each of the objects that produce the sounds. Consequently, the number of computations needed for processing sounds from all sound source objects in this case becomes huge, and thus the processing load on the game processor is large. This leads to a problem that unwanted delays in the essential game processing may occur.

SUMMARY OF THE INVENTION

One aspect of the illustrative exemplary non-limiting implementation of the game apparatus disclosed herein is to provide a novel game apparatus that stores a game sound control program and a game sound control method thereof, and a storage medium.

Another aspect of the exemplary non-limiting implementation of the game apparatus disclosed herein is to provide a storage medium, a game sound control method, and a game apparatus that stores a game sound control program, which are capable of efficiently using a sound source.

One illustrative exemplary non-limiting implementation of the game apparatus disclosed herein includes a storage medium which stores game sound control program instructions, and the game sound control program instructions are executed by a processor of a game apparatus. The game apparatus also comprises a game operating means, a game object data storing means, an image display control means, a sound waveform data storing means, a sound producing position storing means, and a microphone data storing means. In this example game apparatus, the game operating means (e.g., a hand-held controller device) allows imputing game operating control information by a human player. The object storing means stores objects constituting a game image. The image display control means displays the game image including at least the two objects based on the operating information input by the game operating means by the player. The waveform data storing means stores at least one kind of waveform data corresponding to the sound produced by at least the two sound objects constituting the game image. The sound producing position storing means stores sound producing position data indicating a producing position at which the sound is reproduced for each sound object. Furthermore, the microphone data storing means stores microphone data including sound collecting position data indicating a position at which the sounds are to be collected at least during the game.

The game sound control program includes sound volume data computing instructions, sound volume component dividing instructions, object classifying instructions, and sound outputting instructions. The sound volume data calculating instructions compute sound volume data of the sounds respectively produced by at least two sound objects based on both the sound producing position data and the microphone data. The sound volume component dividing instructions divides the sound volume data computed by the sound volume data calculating instructions into the sound volume component data of at least two directions. The object classifying instructions classify, out of all the sound objects, the object producing the same sound. Furthermore, the sound outputting instructions extract the maximum sound volume component data for each component of at least two directions regarding the object producing the same sound, and outputs the sound based on the waveform data of the object and the maximum sound volume component data of each component.

As illustrated by the example implementation shown in FIG. 1, a game apparatus (12) is connected to game operating means (16, 22) for inputting game operating and control information. In this example, game display screen image (80) includes at least two objects which are displayed by an image display control 46, S11). The data for displaying objects (82, 84, 88) constituting this game image (80) are stored in main memory (40). At least two objects constituting the game image (80) are sound objects (84, 88) that produce a sound, for example, and at least one kind of the waveform data corresponding to the sound produced by the sound objects (84, 88) is stored in a waveform data storing means memory (54). In addition, the sound producing position data (722b, 726b, 730b) indicating a producing position of the sound for each sound object (84, 88) is stored in main memory (40). Furthermore, the microphone data including sound collecting position data (74a) indicating a position at which the sound is to be collected at least during the game is stored in the microphone data storing area (74) of main memory (40). Thus, the game sound control program is executed by the game apparatus processor to enable control of game sound during game play. For example, the sound volume data instructions (36, S311) computes sound volume data for the sound generated by the sound objects (84, 88) on the basis of both the sound producing position data (722b, 726b, 730b) and the microphone data. Then, the sound volume component dividing instructions (36, S43) divide the sound volume data computed by the sound volume data calculating instructions (36, S31) into the sound volume component data of at least two directions. The object classifying program (36, S39) classifies, out of all the sound objects (84, 88), the object producing the same sound. If the objects are classified, the sound outputting program (36, S49, S51, S53) extracts the maximum sound volume component data for each component of at least two directions regarding the objects producing the same sound, and outputs the sound based on the waveform data of the objects and the maximum sound volume component data for each component. That is, the sounds produced by the classified objects are made up.

In one exemplary non-limiting implementation, the sound regarding the same kind of the sound object is output by only a single sound-production of the sound source, thus is possible to more effectively use the sound source.

In another example implementation disclosed herein, the sound outputting instructions include sound computing instructions which compute localization data and sound volume data of the sound to be output based on the maximum sound volume component data. For example, sound outputting instructions generate (compute) (36, S53) the localization data and the sound volume data of the sound to be output on the basis of the extracted maximum sound volume component data so that it is possible to output the sound produced by the classified sound objects by a simple sound-production of the sound source.

In another example implementation, the microphone data further includes sound-collection direction data indicating a direction from which the sound is to be collected during the game play, and the sound volume component dividing instructions divide, based on the sound producing position data and the sound-collection direction data, the sound volume data of the sound object into right sound volume data, left sound volume data, and surround sound volume data. For example, the microphone data further includes the sound-collection direction data (74b) indicating a direction from which the sound is to be collected while the game is being played so that the sound volume component dividing instructions (36, S43) are capable of dividing the sound volume data of the sound object into the right sound volume data, the left sound volume data, and the surround sound volume data on the basis of the sound producing position data (722b, 726b, 730b) and its sound-collection direction data (74b).

In one aspect, a set of object sound localization game apparatus processor instructions for computing the localization of one sound based on the sounds of at least two sound objects from the sound producing position data and the microphone data is further provided, and the sound volume component dividing instructions divide the sound volume data of the sound object into the right sound volume data, the left sound volume data, and the surround sound volume data based on the localization of the sound as computed by the object sound localization calculating instructions. For example, the object sound localization calculation instructions (36, S33) compute the localization of one sound based on the sound of at least two sound objects from the sound producing position data (722b, 726b, 730b) and the microphone data. This enables the sound volume component dividing instructions (36, S43) to divide the sound volume data of the sound object into the right sound volume data, the left sound volume data, and the surround sound volume data based on the localization of the sound computed by the object sound localization calculation instructions (36, S33).

In yet another example implementation, the sound producing position data includes position data of a sound object being a point represented by a single coordinate, and position data of the sound object having rail data defined by at least two coordinates, and near coordinate calculation instructions for computing a position existing on a line connecting coordinates indicating the rail data and most close to the sound collecting position data regarding the sound object having said rail data is further provided. The sound volume data calculating instructions compute the sound volume data of the sound object from the coordinate data computed by the near coordinate calculation instructions and the sound-collection position data when computing the sound volume data of the sound object having the rail data, and the sound volume component dividing instructions divides the sound volume data into the right sound volume data, the left sound volume data, and the surround sound volume data on the basis of the coordinate data computed by the near coordinate calculation instructions and the sound collecting position data.

For example, the sound producing position data (722b, 726b, 730b) includes the position data (722b, 726b) of the sound object represented by one coordinate data, and the position data (730b) of the rail data sound object represented by the rail data defined by at least two coordinate data. The near coordinate calculation instructions (36, S63) compute the coordinate data existing on the line connecting the coordinates indicating the rail data, and of the position most close to the sound collecting position data (74a) regarding the sound object (88) having the rail data. The sound volume data calculation instructions (36, S31) compute the sound volume data of the sound object (88) from the coordinate data computed by the near coordinate calculation instructions (36, S63) and the microphone data when computing the sound volume data of the sound object having the rail data. In other words, by computing the volume of the sound based on the assumption that the sound of the sound object exists on the line of the rail data and at the position closest to the sound collecting position data (74*a*), the number of sound producing sources can be reduced. Consequently, the sound volume component dividing instructions (36, S43) divide, the sound volume data into right sound volume data, left sound volume data, and surround sound volume data on the basis of coordinate data computed by the near coordinate calculation instructions (36, S63) and the sound collecting position data (74*b*). In other words, the rail data defined by at least two coordinate data is considered as the sound of the sound objects, and thereby, the number of sound sources producing sounds is reduced. Thus, it becomes possible to handle this situation as though it were a case wherein a plurality of sound objects are represented by a single coordinate data.

Another aspect of the exemplary non-limiting implementation of the game apparatus disclosed herein is a method for controlling game sound during game play which comprises an operating means for inputting operating information by a player; an object storing means for storing objects constituting a game image; an image display control means for displaying the game image including at least two game objects based on the operating information, the two objects being sound generating objects; a waveform data storing means for storing at least one kind of waveform data corresponding to the sound produced by the sound object; a sound producing position storing means for storing sound producing position data indicating a producing position of the sound for each sound object; and a microphone data storing means for storing microphone data including sound collecting position data indicating a position at which the sound is to be collected at least during the game, and comprises steps of: (a) calculating sound volume data of the sounds respectively generated by the sound objects on the basis of both the sound producing position data and the microphone data; (b) dividing the sound volume data computed in step (a) into sound volume component data corresponding to at least two directions; (c) classifying, out of all the sound objects, the object producing the same sound; and (d) extracting the maximum sound volume component data for each component of at least the two directions regarding the object producing the same sound, and outputting the sound based on the waveform data of the object and the maximum sound volume component data of each component.

In the exemplary non-limiting implementation of a game sound control method disclosed herein, similar to the example game sound control program disclosed herein, it is also possible to reduce the number of sounds generated by the sound sources and, thus, use the available sound sources very efficiently.

One illustrative exemplary non-limiting implementation of a game apparatus disclosed herein comprises an operating means for inputting operating information by a player, and is constructed to advance game play according to an operation of the operating means, display a game screen including at least two objects, and produce a sound related to the game screen. This example implementation of a game apparatus further comprises a waveform data storing means, a sound producing position data storing means, a microphone data storing means, a sound volume calculating means, a sound volume component dividing means, a sound outputting means, an object classifying means, and a sound controlling means. The at least two objects are sound objects which generate a sound and the waveform data storing means stores at least one kind of waveform data corresponding to the sounds produced by the sound objects. The sound producing position data storing means stores sound producing position data indicating a producing position of the sound for each sound object. The microphone data storing means stores microphone data including sound collecting position data indicating a position at which the sound is to be collected at least during the game. The sound volume calculating means calculates the sound volume data of the sounds produced by the sound objects based on the sound producing position data and the microphone data. The sound volume component dividing means divides the sound volume data calculated by the sound volume data calculating means into sound volume component data of at least two directions. The sound outputting means outputs the sound based on the waveform data and the sound volume component data. The object classifying means classifies, out of all the sound objects, the objects that produce the same sound. Furthermore, the sound controlling means extracts, regarding the objects that produce the same sound, maximum sound volume component data into individual components of at least the two directions, and transfers to the sound outputting means the waveform data of the object and the maximum sound volume component data of each component.

In this game apparatus, similar to the game sound control program, it is also possible to reduce the total number of sounds produced by the sound sources and, thus, it is possible to more effectively use the available sound sources.

According to another aspect of the illustrative exemplary non-limiting implementation disclosed herein, since sounds generated by the same kind of sound object are combined together into one, it is possible to make more efficient use of the available sound sources.

Furthermore, according another aspect of the illustrative exemplary non-limiting implementation disclosed herein, when configuring/setting up the sound sources, it is possible to combine sounds from several of them into one without resulting in evoking any strange sensations in the operator/player, and therefore, the operator/player is spared from experiencing strange or unnatural feelings while efficient use is made of the sound sources.

The above described objects and other objects, features, aspects and advantages of the illustrative exemplary non-limiting implementations disclosed herein will become more apparent from the following detailed description when taken in conjunction with the accompanying drawings.

DETAILED DESCRIPTION OF EXAMPLE IMPLEMENTATIONS SHOWN IN THE DRAWINGS

Figure 1:
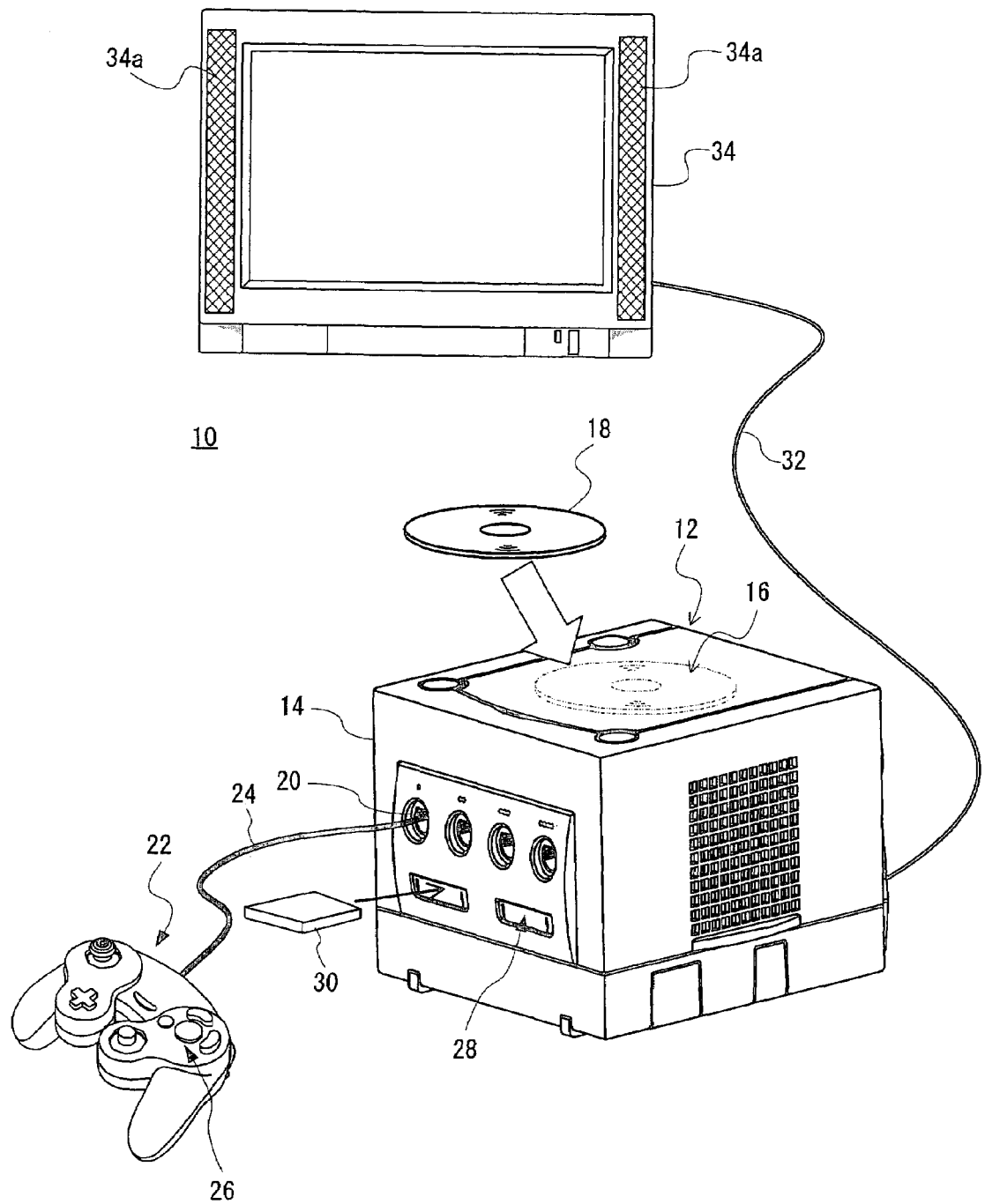
FIG. 1 is an illustrative view of an exemplary non-limiting implementation of a game system apparatus.

Referring to FIG. 1, a video game system 10 of this embodiment includes a video game apparatus 12. Although power is supplied to this video game apparatus 12, this power may be a generally-used AC adaptor (not shown) in the embodiment. The AC adaptor is inserted into a normal wall outlet for home-use, and converts a home-use power into a low DC voltage signal appropriate to drive the video game apparatus 12. As for another embodiment, a battery may be used as the power.

The video game apparatus 12 includes a housing 14 in an approximate cube form, and is provided with an optical disk drive 16 on an upper edge of the housing 14. In the optical disk drive 16, an optical disk 18, which is an example of an information storage medium storing a game program, and etc., is attached. On a front surface of the housing 14, a plurality of (four in this embodiment) connectors 20 are provided. These connectors 20 are for connecting a controller 22 to the video game apparatus 12 by a cable 24, and in this embodiment, it is possible to connect at maximum four controllers 22 to the video game apparatus 12.

The controllers 22 have an operating means (control) 26 on its upper surface, its lower surface, and its side surface, and etc. The operating means 26 includes two analog joysticks, one cross key, a plurality of button switches, and etc., for example. One analog joystick is used for inputting a moving direction and/or a moving speed, a moving amount, and etc., of a player character (moving image character operable by a player by the controller 22) by an inclined amount and an inclination direction of the stick. The other analog joystick controls a movement of a virtual camera by an inclination direction. The cross switch is used for instructing the moving direction of the player character in place of the analog joystick. The button switch is used for instructing an action of the player character, changing a viewpoint of the virtual camera of a three-dimensional image, adjusting the moving speed of the player character, and etc. Furthermore, the button switch is used for carrying out a menu selection, and controlling a movement of a cursor or a pointer, for example.

It is noted that in this embodiment, the controller 22 is connected to the video game apparatus 12 by a cable 24 being integrated therewith. However, the controller 22 may be connected to the video game apparatus 12 by another method such as in a wireless manner via an electromagnetic wave (radio wave or infrared ray, for example). In addition, needless to say, specific structure of the operating means of the controller 22 is not limited to the structure of the embodiment, and is arbitrarily deformable. The number of the analog joystick may be one, or the joystick may not be used at all, for example. The cross switch may not be used.

On a front surface of the housing 14 of the video game apparatus 12, at least one (two in this embodiment) memory slot 28 is provided below the connector 20. Into this memory slot 28, a memory card 30 is inserted. The memory card 30 is used for loading and temporarily storing a game program read-out from the optical disk 18, and etc., and saving game data (game result, for example) of a game played using this game system 10.

On a rear surface of the housing 14 of the video game apparatus 12, an AV cable connector (not shown) is provided, and via the connector, a monitor 34 is connected to the video game apparatus 12 through an AV cable 32. Typically, this monitor 34 is a color television receiver, and the AV cable 32 inputs a video signal from the video game apparatus 12 to a video input terminal of the color television, and a sound signal is input into an audio input terminal. Therefore, on a screen of the color television (monitor) 34, a game image of a three-dimensional (3D) video game is displayed, for example, and a stereo game sound such as a game music, a sound effect, and etc., is output from speakers 34a at both sides. Furthermore, in a case that it is possible to produce a surround effect notwithstanding two speakers, the game sound including the surround sound is output.

In this game system 10, in order for a user or a game player to play the game (or another application), firstly, the user turns on a power of the game apparatus 12, secondly, the user selects the appropriate optical disk 18 storing the video game (or another application that the user intends to play), and thirdly, loads the optical disk 18 into the disk drive 16 of the game apparatus 12. In response thereto, the game apparatus 12 is caused to start executing the video game or another application based on a software stored in the optical disk 18. The user operates the controller 22 for applying an input to the game apparatus 12. The game or another application is started by operating one of the operating means 26, for example. By operating another function of the operating means 26, it is possible to move the moving image character (player character) to a different location or change the viewpoint (camera position) of the user in a three-dimensional (3D) game world.

Figure 2:
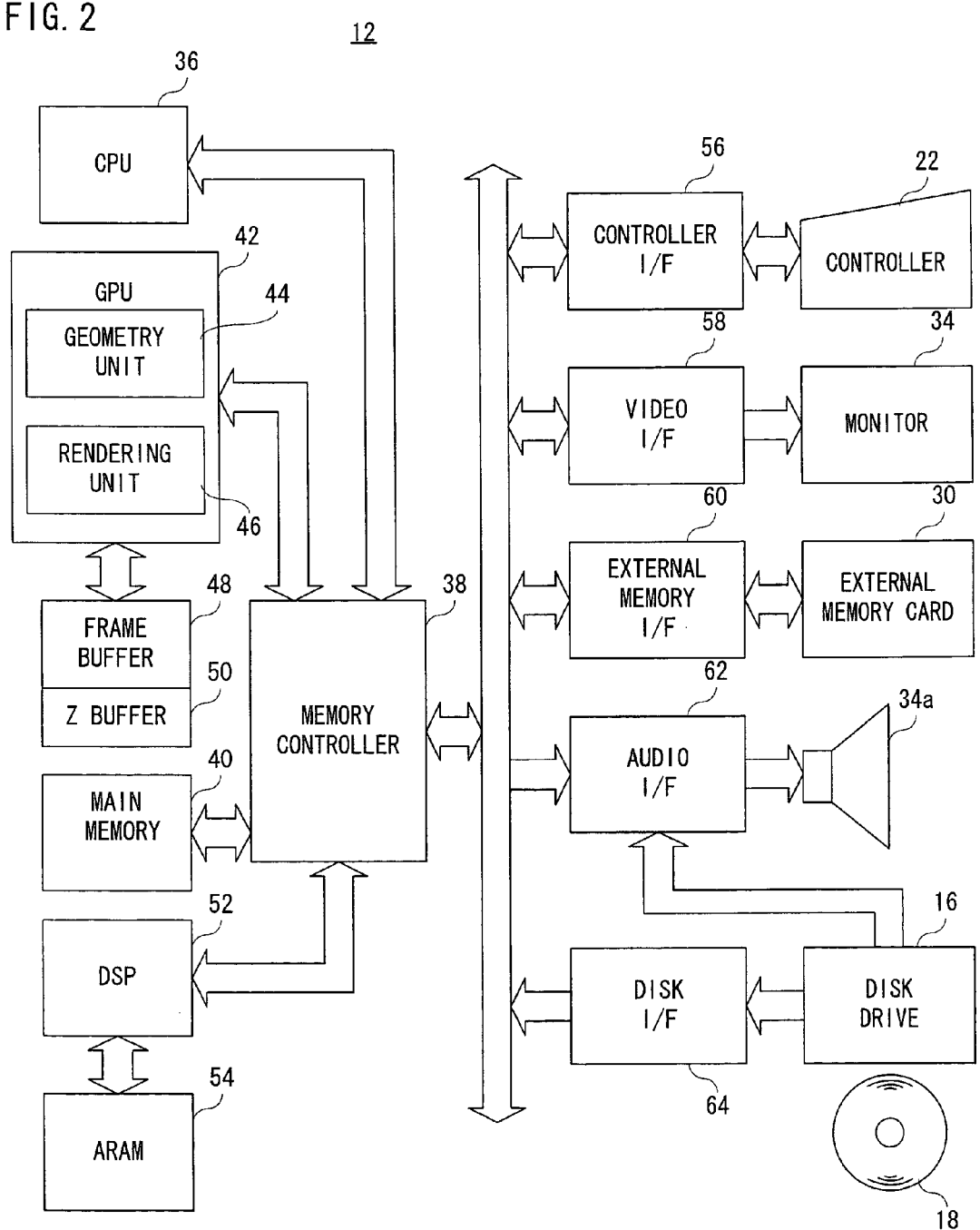
FIG. 2 is a block diagram showing electric structure of a video game apparatus shown in the FIG. 1 embodiment.

FIG. 2 is a block diagram showing electric structure of the video game system 10 of the FIG. 1 embodiment. The video game apparatus 12 includes a central processing unit (hereinafter briefly referred to as "CPU") 36. The CPU 36 is also called as a computer or a processor, and responsible for controlling the whole video game apparatus 12. The CPU or computer 36 functions as a game processor, and to this CPU 36, a memory controller 38 is connected via a bus. The memory controller 38 mainly controls, under a command of the CPU 36, writing or reading a main memory 40 coupled thereto via the bus. To this memory controller 38, a GPU (Graphics Processing Unit) 42 is connected.

The GPU 42 is a part of a rendering means, and is constructed of a single chip ASIC, for example. Furthermore, the GPU 42 receives a graphics command from the CPU 36 via the memory controller 38, and in accordance with the command, generates the three-dimensional (3D) game image by a geometry unit 44 and a rendering unit 46. That is, the geometry unit 44 performs a coordinate operation or calculation process such as a rotation, a movement, a deformation, and etc., of various characters and objects (constructed of a plurality of polygons, and the polygon is referred to as a polygonal plain surface defined by at least three vertexes coordinates) with a three-dimensional coordinate system. The rendering unit 46 performs an image generating process such as pasting or rendering a texture (pattern image) to each polygon of the various objects. Therefore, 3D image data to be displayed on the game screen is created by the GPU 42, and the image data (texture data) is drawn (stored) within a frame buffer 48.

It is noted that data (a primitive or polygon, the texture, and etc.) required by the GPU 42 for executing the graphics command is obtained as a result of the GPU 42 accessing the main memory 40 via the memory control 38.

The frame buffer 48 is a memory for developing (accumulating) one frame of the image data of a luster scan monitor 34, for example, and is rewritten every one frame by the GPU 42. A video I/F 58 described later reads out the data of the frame buffer 48 via the memory controller 38 so that the 3D game image is displayed on the screen of the monitor 34.

In addition, a Z buffer 50 has a storing capacity equal to the number of pixels (storing location or address) corresponding to the frame buffer 48 the by the number of bits of depth data per one pixel, and stores depth information or the depth data (Z value) of dots corresponding to respective storing locations of the frame buffer 48.

It is noted that both the frame buffer 48 and the Z buffer 50 may be constructed using a portion of the main memory 40.

In addition, the main controller 38 is connected to an SRAM 54 via a DSP (Digital Signal Processor) 52. Therefore, the memory controller 38 controls not only the main memory 40 but also a writing and/or reading of the SRAM 54 as a sub memory.

The DSP 52 functions as a sound processor, accesses sound data (see FIG. 3) stored in the main memory 40, accesses sound waveform data (see FIG. 6) written in the SRAM 54, and so on so as to produce audio data corresponding to a sound, voices or music necessary for the game. In this embodiment, for example, the DSP 52 generates the audio data corresponding to the sound produced by sound objects such as a "torch", a "river", and etc., described in detail later by using the sound waveform data.

Furthermore, the memory controller 38 is connected to respective interfaces (I/F) 56, 58, 60, 62, and 64 by the bus. The controller I/F 56 is an interface for the controller 22, and transmits an operating signal or data of the operating means 26 of the controller 22 to the CPU 36 through the memory controller 38. The video I/F 58 accesses the frame buffer 48, reads out the image data created by the GPU 42, and transmits the image signal or the image data (digital RGB pixel value) to the monitor 34 via the AV cable 32 (FIG. 1).

The external memory I/F 60 connects to the memory controller 38 a memory card 30 (FIG. 1) inserted into the front surface of the game apparatus 12. Thereby, it becomes possible for the CPU 36 to write the data into this memory card 30 via the memory controller 38, or read out the data from the memory card 30. The audio I/F 62 transmits to the speaker 34a of the monitor 34 the audio data applied from the DSP 52 through the memory controller 38 or an audio stream read-out from the optical disk 18 as an audio signal (sound signal) corresponding thereto.

It is noted that in a case of a stereo sound, at least two speakers 34a are provided, that is, one in right, and the other in left. In addition, as a result of a surround process, it may be possible for the sound to be produced from a rear side even if there are only two right and left speakers.

Furthermore, the disk I/F 64 connects the disk drive 16 to the memory controller 38. Therefore, the CPU 36 controls the disk drive 16. Program data, texture data, and etc., read-out from the optical disk 18 by this disk drive 16 are written into the main memory 40 under the control by the CPU 36.

Figure 3:
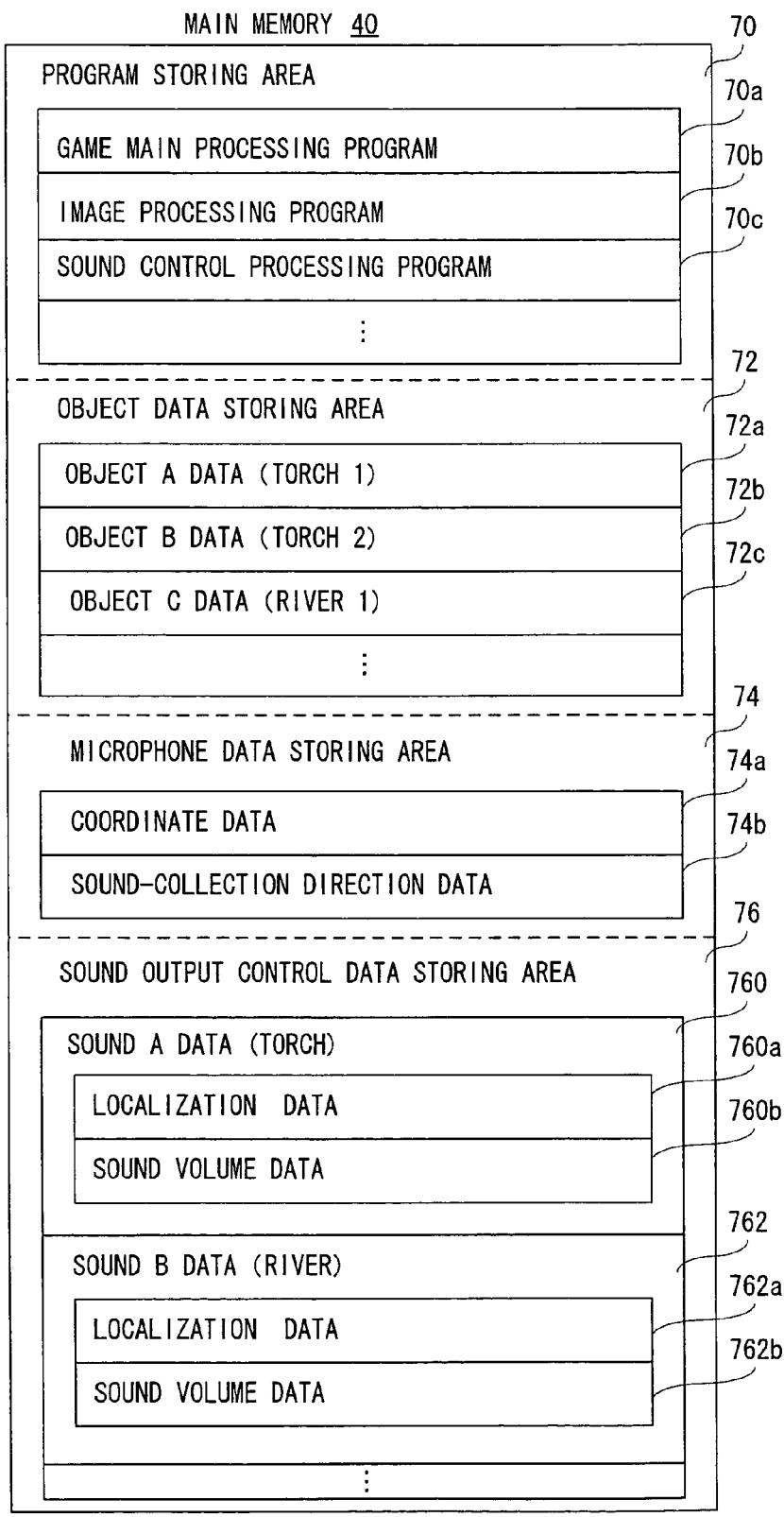
FIG. 3 is an illustrative view showing a memory map of a main memory shown in FIG. 2.

FIG. 3 is a memory map of the main memory 40. The main memory 40 includes a program area 70, an object data storing area 72, a microphone data storing area 74, and a sound output control data storing area 76. Into the program storing area 70, a game program read-out from the optical disk 18 is stored at one time or partially and sequentially. This game program is constructed of a game main processing program 70a, an image processing program 70b, and a sound control processing program 70c, and etc.

Data regarding non-player objects such as object A (torch 1) data 72a, object B (torch 2) data 72b, and object C (river 1) data 72c is read from the optical disk 18, and loaded into the object data storing area 72. Although not illustrated, data of the game character such as player character object and enemy character object or data of a game world (map), are also further loaded into the storing are 72.

It is noted that the respective object data such as the object A data 72a, the object B data 72b, and the object C data 72c are formed of the polygons.

In addition, into the main memory 40, the data such as the above respective characters, objects, and etc, may be loaded from the optical disk 18 as required.

Coordinate data (sound collecting position data) 74a indicating a position (sound collecting position) in the game world of a virtual microphone 86 (see FIG. 8) provided together with the virtual camera, and sound-collection direction data 74b indicative of the sound-collection direction of the virtual microphone 86 determined in advance in correspondence to the position thereof are read-out from the optical disk 18, and loaded into the microphone data storing are 74.

Into the sound output control data storing area 76, sound data such as sound A data 760, and sound B data 762, and etc. are stored. However, these sound data are data calculated through a sound controlling process described later. The sound A data 760 is the sound data regarding the "torch" in this embodiment, and includes localization data 760a and sound volume data 760b. Furthermore, the sound B data 762 is the sound data regarding the "river" in this embodiment, and includes localization data 762a and sound volume data 762b. The localization data is data showing a direction from which the object (torch or river, and etc.) in the game world produces the sound, and the sound volume data is data showing a volume of the sound produced by the object (torch or river, and etc.).

It is noted that although not illustrated, into the sound output control data storing area 76, data of the sound, the music, the voices, and etc., necessary for the game are also loaded and written.

Figure 4:
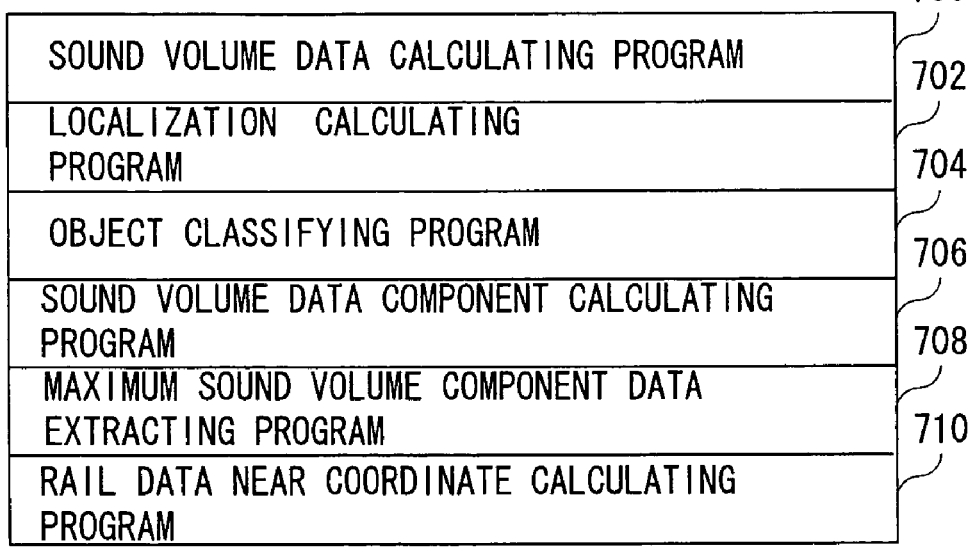
FIG. 4 is an illustrative view of game processor instruction components a sound control processing program shown in FIG. 3.

Furthermore, as shown in FIG. 4, the sound control processing program 70c includes a sound volume calculating program 700, a localization calculating program 702, an object classifying program 704, a sound volume data component calculating program 706, a maximum sound volume component data extracting program 708, and a rail data near coordinate calculating program 710. It is noted that these programs are not executed separately (independently), but executed according to a series of flow (see FIG. 14 and FIG. 15) as described later.

Figure 5:
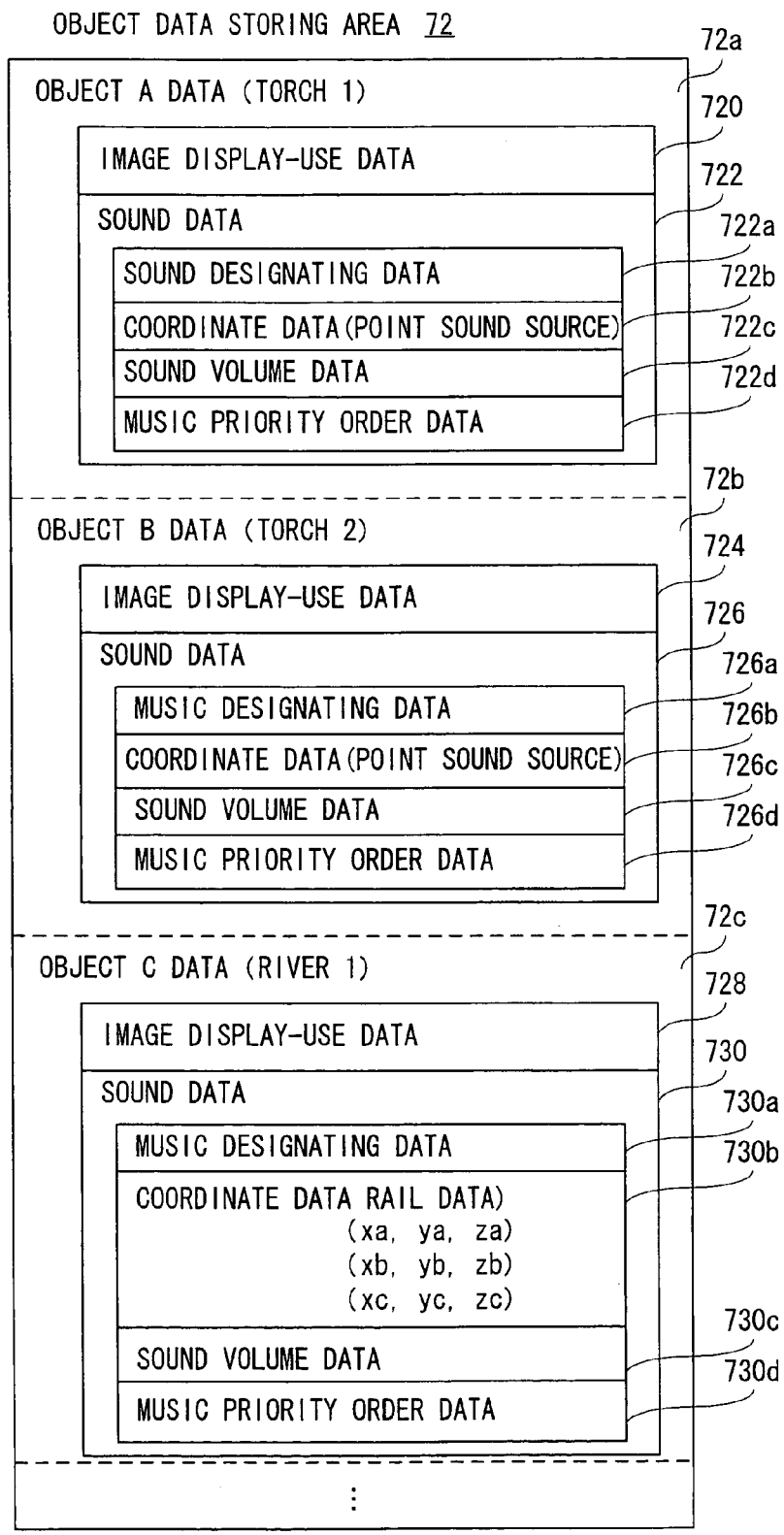
FIG. 5 is an illustrative view showing an example arrangement of data stored in an object data storing area shown in FIG. 3.

Furthermore, the object A data 72a-object C data 72c are constructed as shown in FIG. 5. The object A data 72a includes image display-use data 720 for displaying the object A (torch 1) on the monitor 34, and sound data 722 for outputting the sound produced by the object A (torch 1) from the speaker 34a.

In addition, the sound data 722 includes sound designating data 722a, coordinate data 722b, sound volume data 722c, and sound priority order data 722d. The sound designating data 722a is index data for designating (selecting) from a plurality of the sound waveform data (see FIG. 6) stored in the SRAM 54 the sound waveform data to be used in a case of outputting the sound produced by the object A. The coordinate data 722b indicates a location or position in the game world in which the object A exists. In this embodiment, this is illustrated in a three-dimensional coordinate.

It is noted that the object A is the torch, and such the torch is arranged in a predetermined location in the game world, and therefore, in this case, the coordinate data indicates the location or position of the sound of the sound object.

The sound volume data 722c is data showing the volume of the sound produced by the object A. Furthermore, the sound priority order data 722d is data for determining by comparing the sound object with another sound object whether or not to produce the sound in a case that a plurality of the objects (sound objects) exist in the game world displayed in one screen of the monitor 34, and the number of sound-productions of the usable sound sources, that is, the maximum number of simultaneous sound-productions usable by the DSP 52. That is, in a case that the number of the sound-productions of the sound sources is not sufficient, the sound of the sound object having a low priority is not given.

The object B data 72b includes image display-use data 724 and sound data 726. The object B (torch 2) is the same kind of the object data as the object A (torch 1) so that the image display-use data 724 and the sound data 726 have the same contents as above. It is noted that the object B is arranged in a location or position different from the position or location of the object A in the game world, and accordingly, the contents of coordinate data 726b, sound volume data 726c, and sound priority order data 726d of the sound data 726 differ from those for the object A.

It is noted that the two object A and the object B are the same kind of sound objects, and therefore, the sound designating data 726a is the same data as the sound designating data 722a.

The object C data 72c includes image display-use data 728 for displaying the object C (river 1) on the monitor 34, and sound data 730 for outputting from the speaker 34a the sound produced by the object C (river 1). In addition, the sound data 730 includes, as similar to the object A and the object B, sound designating data 730a, coordinate data 730b, sound volume data 730c, and sound priority order data 730d. The contents of the respective data are approximately the same as the data regarding the object A and the object. However, the object C is the "river", and the sound waveform data to be used differs from waveform for the torch so that the content of the sound designating data 730a is changed. Furthermore, for this object C, the sounds of a plurality of sound objects are provided in such a manner as to be flown along the river, and therefore, a plurality of coordinates are described in the coordinate data 730b. That is, the rail data defined by at least two coordinate data is stored. Furthermore, in the sound volume data 730, the sound volume data corresponding to each of the rails (see FIG. 12) determined by the rail data is stored.

Figure 6:
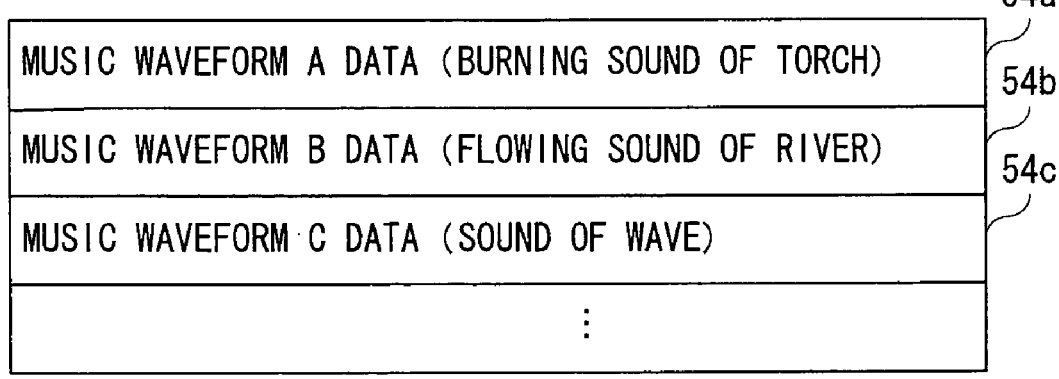
FIG. 6 is an illustrative view showing waveform data of a sound object stored in an SRAM shown in FIG. 2.

In addition, the above-described sound waveform data is loaded and written into the sound waveform data storing area, which is the SRAM 54 as a sub memory in this embodiment, from the optical disk 18. As shown in FIG. 6, in the SRAM 54, sound waveform A data 54a regarding a burning sound of the torch, sound waveform B data 54b regarding a flowing sound of the river, sound waveform C data 54c regarding a sound of wave, and etc., are stored, for example. Although not illustrated, the sound waveform data regarding other sound objects are also stored. The DSP 52 accesses, under the control by the CPU 36, one or two or more of the sound waveform data 54a, 54b, 54c, . . . so as to generate or create audio data of the sounds produced by the sound objects. Generated audio data is converted into an audio signal by the audio I/F 62, and then, output to the speakers 34a.

Figure 7:
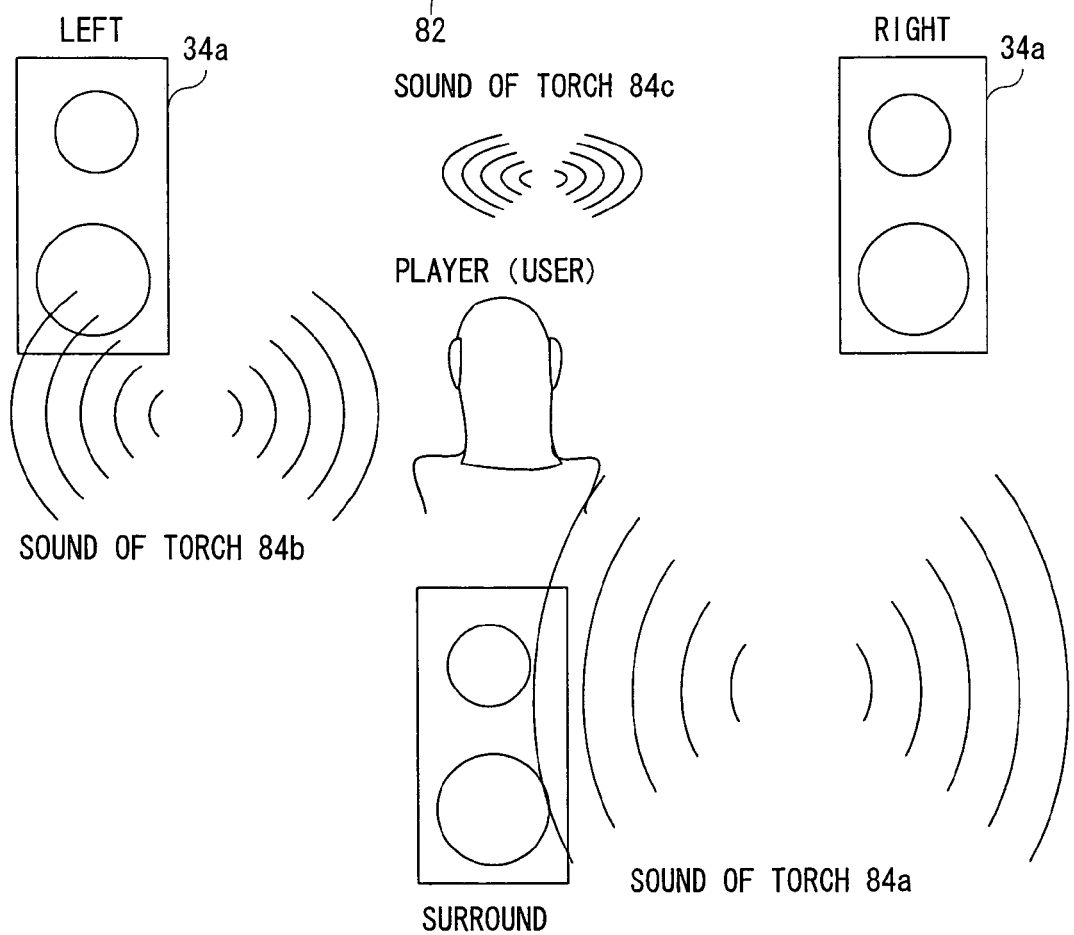
FIG. 7 is an illustrative view showing one example of a game screen displayed on a monitor in the game system of the FIG. 1 embodiment, and a volume of a sound of the sound object output from speakers regarding the game screen.

In FIG. 7, a game screen 80 is displayed on the monitor 34, and a volume of the sound of the sound object (burning sound of the torch) output from the right and left speakers 34a and the surround speaker is illustrated in this FIG. 7 in a case that the game screen 80 is displayed. It is noted that in an example shown in FIG. 7, a case that three torches are used as the sound object to output the sounds is shown. In addition, the player or the user is positioned in such a manner as to face the game screen 80 (monitor 34), and surrounded by the right and left speakers 34a and the surround speaker.

In the game screen 80, the player object 82 is arranged at a lower side of the center of the screen, and stands in such a manner as to turn its back toward the player. At the rear of the player object 82, a torch 84a is arranged, obliquely to the front left of the player object 82, a torch 84b is arranged, and diagonally to the forward right of the player object 84, a torch 84c is arranged. Furthermore, viewed from a depth direction of the game screen 80 only, on the nearest side of the depth direction, the torch 84a is arranged, behind the torch 84a, the torch 84b is arranged, and on the furthest side of the depth direction, the torch 84c is arranged. In addition, viewed from a horizontal direction (width direction) of the game screen 80, on the right side of the game screen 80, the torch 84a is arranged, on the left side of the game screen 80, the torch 84b is arranged, and at an approximately center of the game screen 80, the torch 84c is arranged.

Figure 8:
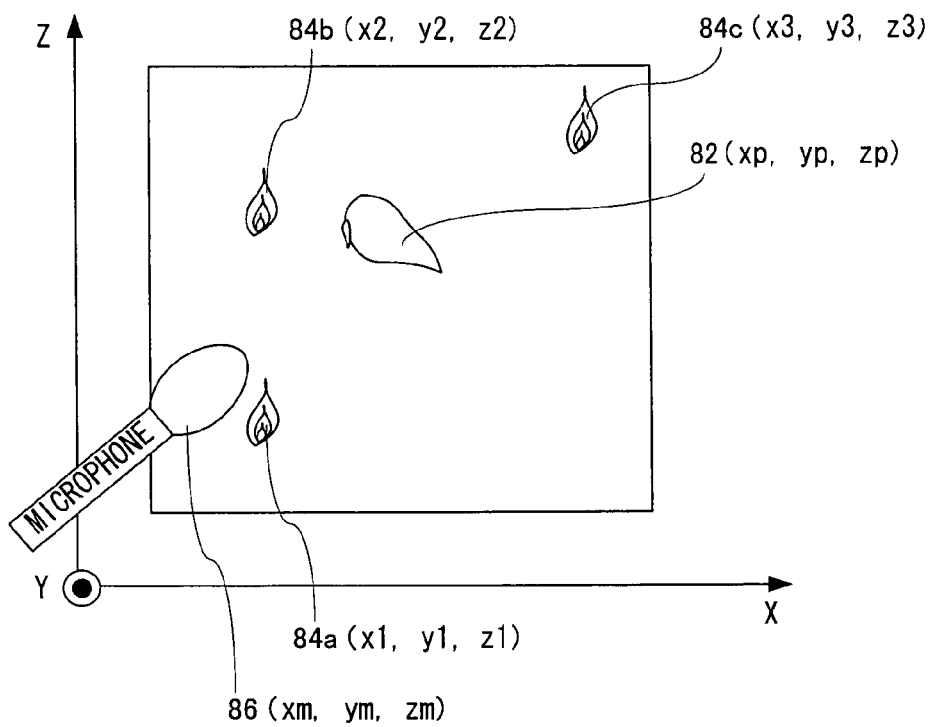
FIG. 8 is an illustrative view showing a three-dimensional coordinate (camera coordinate) of a game world corresponding to the game screen shown in FIG. 7.

Such the game screen 80 is generated based on a video (image) photographed by the virtual camera provided to be moved freely in the game world, and rendered (displayed) on the monitor 34. As shown in FIG. 8, in the game world, the player object 82, the torches 84a-84c, and the virtual microphone 86 are represented by a positional relationship in a three-dimensional coordinate. This is determined by the coordinate data (FIG. 5) included in the above-described object data. The player object 82 exists at a position indicated by the three-dimensional coordinate (xp, yp, zp), for example. In addition, the torch 84a, the torch 84b, and the torch 84c exist in locations or positions indicated by the three-dimensional coordinates (x1, y1, z1), (x2, y2, z2), and (x3, y3, z3), respectively. Furthermore, the virtual microphone 86 exists at a location indicated by the three-dimensional coordinate (xm, ym, zm).

It is noted that for the sake of illustration, the virtual camera is not illustrated. However, the virtual camera exists in the same location as the virtual microphone 86.

As described above, the game screen 80 displays the video (image) photographed by the virtual camera on the monitor 34. At this time, by converting a world coordinate system of the game world into a three-dimensional camera coordinate, the image in a photographing direction of the virtual camera is displayed.

Figure 9:
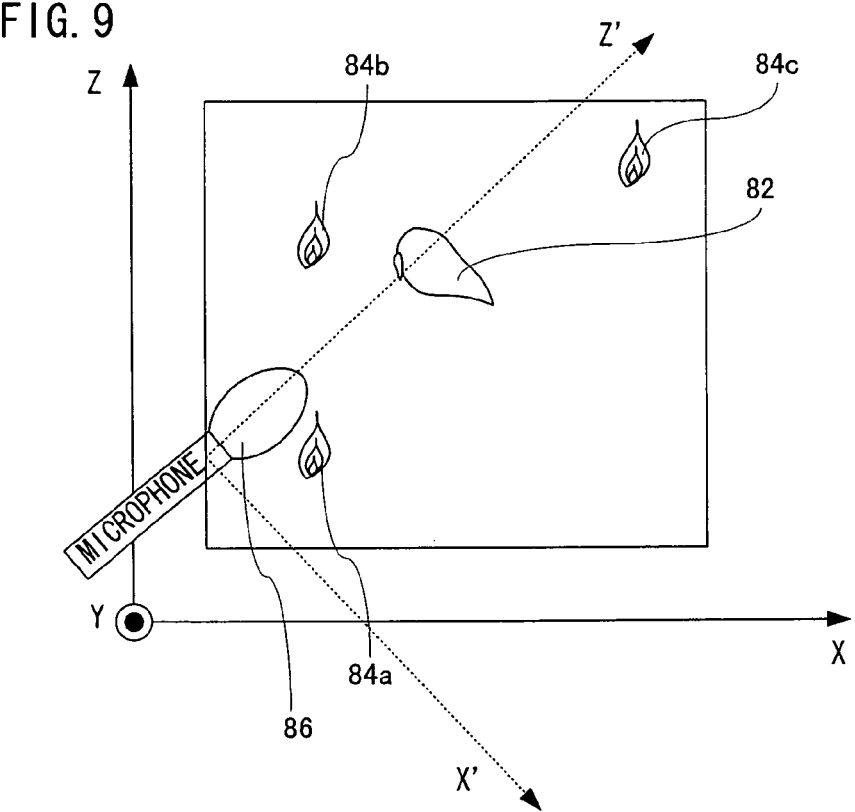
FIG. 9 is an illustrative view showing a three-dimensional coordinate (camera coordinate) of the game world corresponding to the game screen shown in FIG. 7.
Figure 10:
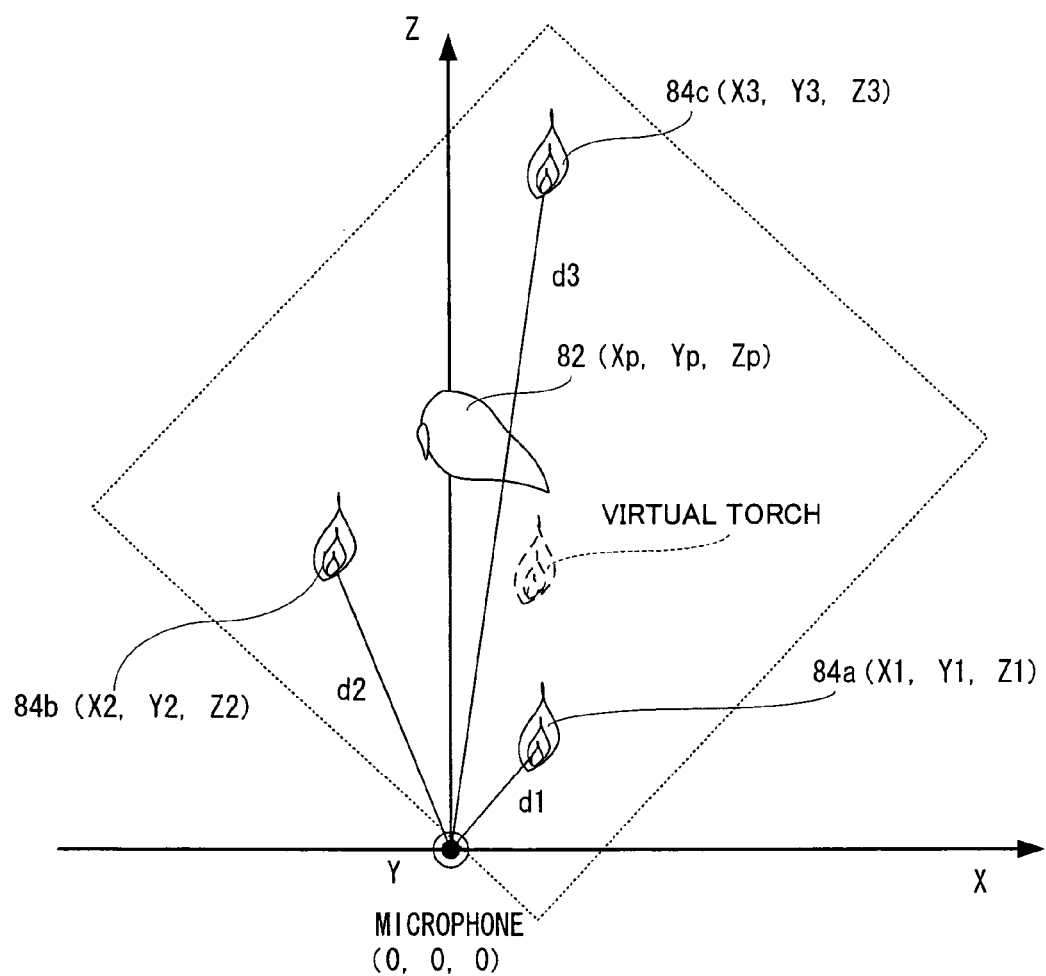
FIG. 10 is an illustrative view showing a three-dimensional coordinate after conversion that the three-dimensional coordinate of the game world shown in FIG. 7 is converted into a rendering coordinate.

That is, as shown in FIG. 9, the photographing direction of the virtual camera, that is, a sound-collection direction of the virtual microphone 86 is determined on a line connecting the player character 82 and the virtual microphone 86, and the line is determined as a Z' axis. However, the sound-collection direction of the virtual microphone 86 is determined by the sound-collection direction data 74b stored in correspondence to the coordinate data 74a stored in the microphone data 74 as described above. In addition, an axis that rotates the Z' axis by 90 degrees clockwise at the center of the position of the virtual camera 86 is determined as an X' axis. Next, as shown in FIG. 10 by rendering the position of the virtual microphone 86 as a position of origin (0, 0, 0), a coordinate conversion is performed in such a manner that the Z' axis and the X' axis and the Z axis and the X axis are respectively overlapped each other. More specifically, the position of the virtual microphone 86 shown in FIG. 9 is translated to the origin position, and therefore, the game world photographed by the virtual camera may be rotated at the center of the origin in such a manner that the Z' axis and the X' axis and the Z axis and the X axis respectively overlapped each other. Thus, the game image 80 as shown in FIG. 7 is displayed on the monitor 34.

In addition, in a case that the game screen 80 as shown in FIG. 7 is displayed, a BGM (background music) of the game and the sound (burning sound of the torch) produced by the sound object are output from the right and left speakers 34a and the surround speaker. It is noted that in FIG. 7, for the sake of simplicity, only the volume of the burning sound of the torch is illustrated, and the volume of the sound other than the sound produced by the sound object such as the BGM is omitted.

Herein, if the volume of the sound output from the speaker 34 is described in three levels, that is, large, medium, and small, regarding the burning sound of the torch 84a, a volume of the right speaker 34a is large, a volume from the left speaker 34a is medium, and a volume of the surround speaker 34a is small. Furthermore, regarding the burning sound of the torch 84b, a small volume is heard from the right speaker 34a, a medium volume from the left speaker 34a and the surround speaker 34a. In addition, regarding the burning sound of the torch 84c, a volume of each of the right and left speakers 34a is small, and a volume from the surround speaker 34a is large.

Therefore, as shown in FIG. 7, the burning sound of the torch 84a is output in such a manner that the large volume is heard between the right speaker 34a and the surround speaker. Furthermore, the burning sound of the torch 84b is output in such a manner that the medium volume is heard between the left speaker 34a and the surround speaker. In addition, the burning sound of the torch 84c is output in such a manner that the small volume is heard at an approximately center of the right and left speakers 34a.

It is noted that in FIG. 1, the surround speaker is omitted, and however, the surround speaker may be additionally provided. In addition, by adjusting the sound volume and the localization of the right and left speakers 34a, a virtual surround speaker may be provided. In the latter case, it is possible to adopt structure and a method disclosed in Japanese Patent Laying-open No.2000-93579.

Thus, in a case that the sound is output from the sound source each corresponding to each of the sound objects displayed on the game screen 80, as shown in FIG. 10, at the center of the origin after converted into the three-dimensional camera coordinate, the sound-collection direction is determined by the rotation degree from the Z axis, and the volume of the sound (sound in a case that each sound object is heard) to be output is determined by a distance between the origin and the sound object. However, in the game apparatus 12, it is also necessary to generate the BGM in the game, the sound (music) such as the sound effect, and etc., and therefore, in a case that a multiple of the sound objects exist on the game screen 80, the number of the sound-productions exceeds the number of the usable sound sources, that is, the maximum number of simultaneous sound-productions allowing the DSP to use.

In such the case, it is considered to determine the sound object that does not output the sound according to the priority order data (see FIG. 5), for example. However, it is somewhat strange that the sound of one of the torches is not output when the torches exist on the both right and left sides. Furthermore, even if the sound is not important, a liveliness of the game may be lost as a result of that sound not being output.

Therefore, in this example implementation, in the case where the same kind of a plurality of sound objects exist on the game screen 80, a sound is output by only a single sound-production, thus saving the available resources of the sound source. Accordingly, the available resources of the sound source are used more effectively.

More specifically, regarding all the sound objects existing in the game screen 80, based on the respective coordinates (three-dimensional coordinates), a distance to the origin position, and a sound-production direction (angle toward the Z axis), that is, the localization, are calculated according to Equation 1 and Equation 2, respectively. It is noted that as described later, although the sound volume (data) is calculated using the distance toward the origin, in a case of evaluating the sound volume, a Y axis component may be disregarded, and therefore, in Equation 1, the distance is calculated based on an X component and a Z component.

$$\text{distance } DP = \sqrt{\{(XP)2 + (ZP)2\}} \qquad \text{[Equation 1]}$$

It is noted that P=1, 2, 3, . . . m, . . . p.

$$\text{production direction (localization)} \theta = \qquad \text{[Equation 2]}$$
$$\sin^{-1}(|XP|/DP) = \cos^{-1}(|ZP|/DP)$$

It is noted that |·| means an absolute value, and XP and ZP are numerical values included in the coordinate of the sound object, and DP is a distance evaluated by Equation 1.

Next, the sound volume (data) VP allowed to be heard regarding the sound object based on the distance determined by using Equation 1 is calculated according to Equation 3.

$$\text{sound volume } VP=(1-(DP/VD))\times Vo \quad \text{[Equation 3]}$$

It is noted that DP is the distance calculated by Equation 1, VD is a distance that the sound becomes not to be heard anymore, and Vo is an initial value of the sound volume (data) of the sound object. Herein, VD is a value determined in advance by a programmer or developer of the game. In addition, Vo is an initial value of the sound volume previously determined by the sound volume data 722c, the sound volume data 726c, the sound volume data 730c, and etc., shown in FIG. 5.

Thus, the localization data and the sound volume data in a case of allowing each sound object to be heard are calculated. Next, the sound objects are classified by each sound object producing the same sound. In addition, from the sound volume data and the localization data calculated regarding each sound object, components of the volumes of the sounds output from the speakers 34a, that is, in this embodiment, an L (left side sound volume component), an R (right side sound volume component), and a surround (hereinafter referred to as "SR") component are calculated. Next, out of the sound objects producing the same sound, a maximum value is selected for each of the L, the R, and the SR component. Next, based on the maximum values of the selected L, R, and SR component, the sound volume and the localization of the sound to be output are calculated. Then, the sound is output based on the calculated sound volume and the localization.

That is, in an example shown in FIG. 10, it is considered that a virtual torch making the torch 84a, the torch 84b, and the torch 84c up one is supposed, and the burning sound of the virtual torch is output. Thus, even in a case that the virtual torch is used, the burning sound of the torch is a sound output for enhancing the liveliness of the game so that the player or the user does not feel so strange.

Furthermore, in the above example, although a case that a plurality of the sounds of one sound object exist is described, there exists as the sound object one that, a plurality of point sound sources are included in one object such as a river, and a wave. Such the sound object can be thought of having a plurality of the sound objects (sound source) of the same kind existing.

Figure 11:
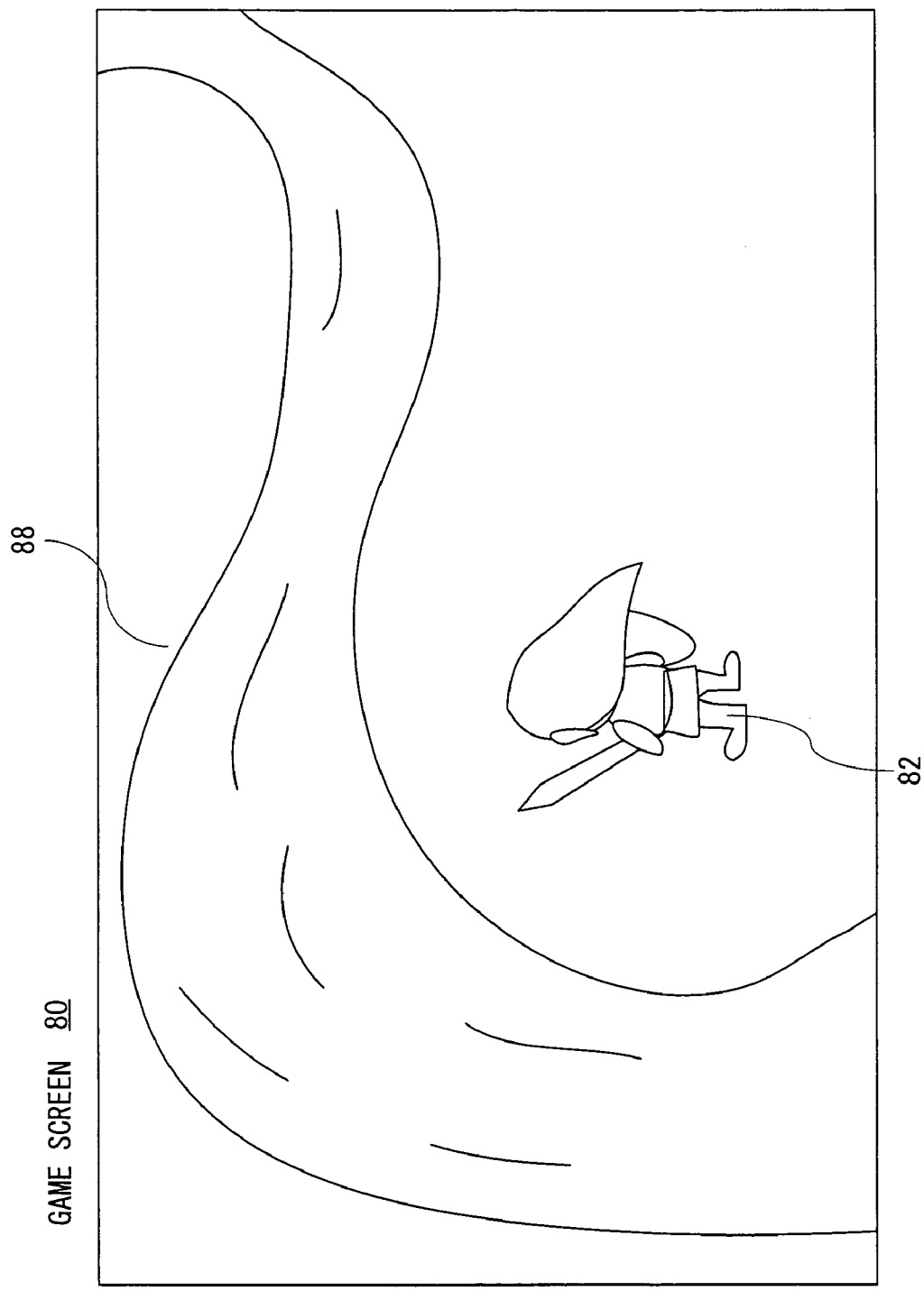
FIG. 11 is an illustrative view showing another example of the game screen displayed on the monitor in the game system of the FIG. 1 embodiment.

In a case that the game screen 80 as shown in FIG. 11 is displayed, for example, similar to the case described by using FIG. 9 and FIG. 10, the world coordinate system in the game world is converted into the camera coordinate. In this game screen 80, a player object 82 and a sound object 88 such as a "river" are displayed.

Figure 12:
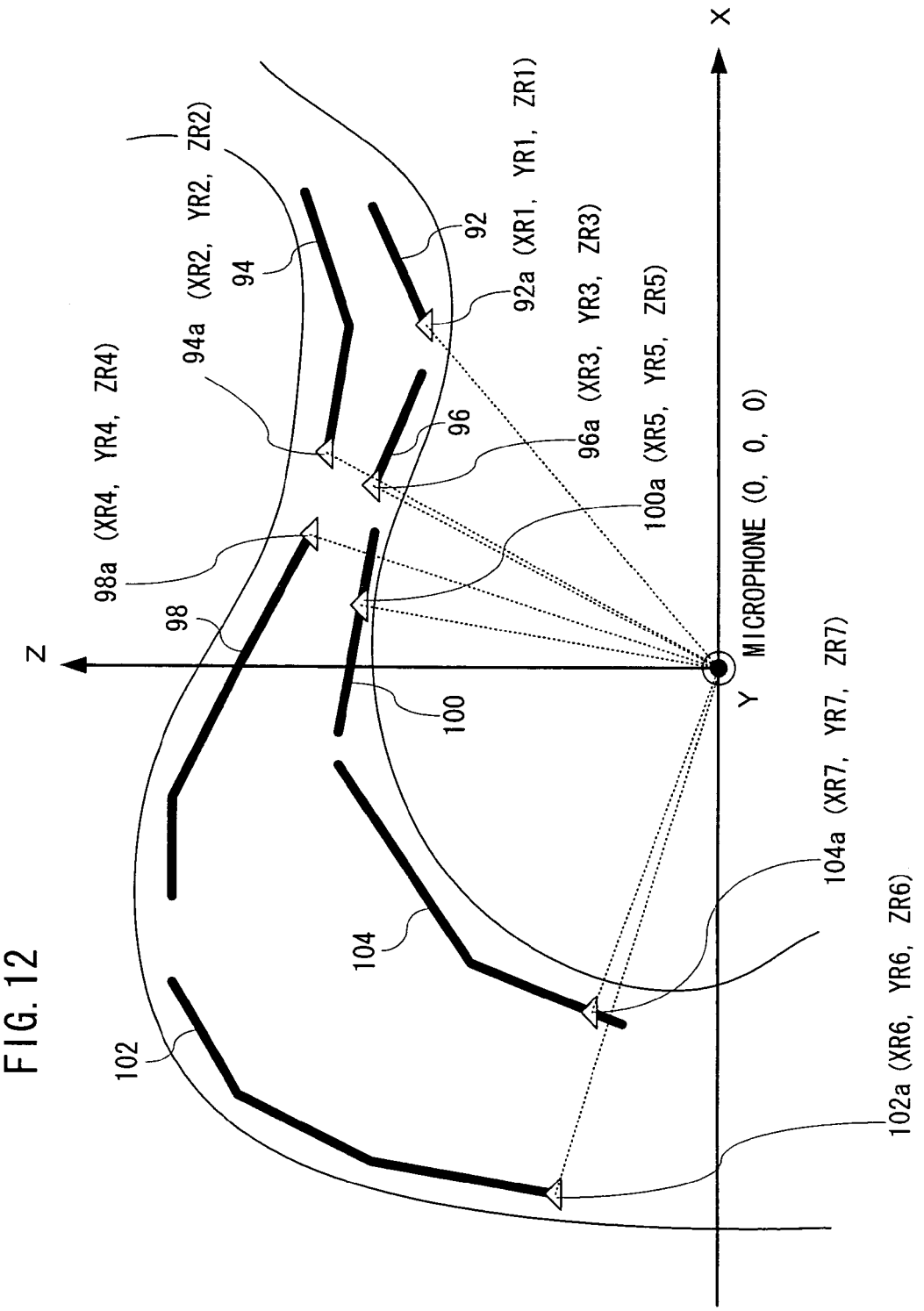
FIG. 12 is an illustrative view showing a sound position of the sound of the sound object displayed in the game screen shown in FIG. 11.

In addition, as shown in FIG. 12, in the sound object 88 such as the "river", a position of the sound of the sound object is represented by so-called rail data. As understood from this FIG. 12, a plurality of rails 92, 94, 96, 98, 100, 102, and 104 indicated by straight lines (line segments) or folded lines (curved line that a plurality of the line segments are coupled) are set on the both sides of the river, and each of the rails 92-104 is defined as the sound object of a point that produces the sound from any point on the straight lines (line segments) connecting the coordinates indicated by the coordinate data. A near point between a position (sound collecting position) at which the virtual microphone 86 exists and the rail, that is, a point on the rail and having a shortest distance to the coordinate (point) of the virtual microphone 86 is determined as a position of the sound object, for example, and in accordance with the distance between the sound object and the virtual microphone 86, the volume of the sound that allows the sound object to be heard is calculated.

However, as described above, in a case that the maximum number of usable simultaneous sound-productions is exceeded, the sound of the sound object not allowed to be heard is determined according to the priority order, so that the sound is missing, thus the liveliness is lost, and the strange feeling is experienced.

For this reason, similar to the sound of the sound object such as the torch, the virtual sound object is supposed, and the sound is output by only the single sound-production at the sound source.

First, in order to determine the position of the sound object of the point, as described above, the near point to the virtual microphone 86 is found for each of the rails 92-104. More specifically, it is evaluated whether or not there is a straight line crossing the rail at right angles and passing the origin for each of the rails 92-104. In a case that such the straight line exists, one position is determined at a point (point on the rail) that the straight line and the rail are met at right angle. That is, one sound object is defined. However, in a case that the rail is constructed of a curved line that two or more line segments are joined such as the rails 94, 98, 102 and 104, out of the positions of the sound objects existing on one rail, it is found whether or not the above-described straight line exists regarding only the line segment including the position of the sound object having the shortest distance toward the origin. On the other hand, in a case that there is a straight line crossing the line segment at right angle and passing the origin, a distance between the coordinate indicated by the coordinate data as the rail data and the origin is calculated, and the point (coordinate) having the shortest distance is determined as the position of the sound object.

It is noted that in FIG. 12, for the sake of simplicity, the position of the selected sound object is marked with a white triangular (Δ).

In addition, similar to the case shown by Equation 1, it is possible to easily calculate the distance from the coordinate of the origin and the coordinate indicated by the coordinate data as the rail data.

However, since it is troublesome to execute a process such as calculating the straight line crossing each rail at right angle and passing the origin, and etc., similar to the case that such the straight line does not exist, out of the coordinates (points) indicated by the coordinate data as the rail data, the coordinate (point) having the shortest distance to the coordinate (point) of the virtual microphone 86 may be determined as the position of the sound object. In such the case, since the distance between the coordinate (point) indicated by the coordinate data as the rail data and the coordinate (point) of the virtual microphone 86 may be calculated only, thus possible to reduce a processing charge or load.

Thus, when the sound objects are selected from each of the rails 92-104, regarding each of the selected sound objects, the sound volume data that allow the sound of the sound object to be heard is calculated according to Equation 3 using the calculated distance, and the localization data is calculated according to Equation 2 using the three-dimensional coordinate of the position of the selected sound object and the calculated distance. Next, from the calculated sound volume data and the localization data, the L, R and SR components for each position of the sound of each sound object are calculated, and from the calculated result, the maximum values of the L, R and SR components are selected. Next, from the selected maximum values of the L, R and SR components, the sound volume and the localization are calculated. That is, the location or position of the sound of the virtual sound object regarding the sound object such as the "river", the sound volume and the localization of the sound to be output using the sound source are determined. In addition, based on the determined sound volume and the location, the sound is output from the sound source.

Figure 13:
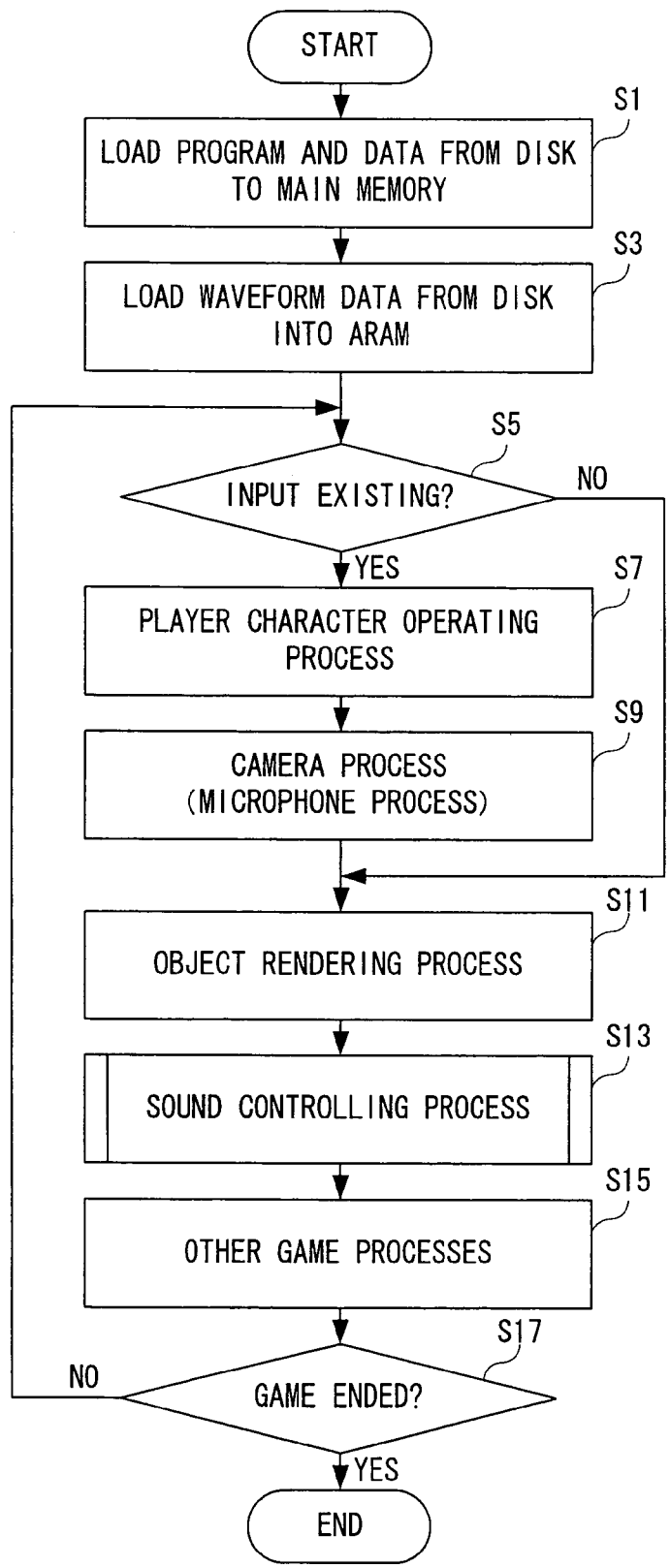
FIG. 13 is a flowchart showing one example of a game process of a CPU shown in FIG. 2.

The above-described operation is processed by the CPU 36 shown in FIG. 2 according to a flowchart as shown in FIG. 13-FIG. 16. When the optical disk 18 is loaded into the disk drive 16 of the game apparatus 12, as shown in FIG. 13, the CPU 36 starts a game process, and loads a program (a game main processing program, an image processing program, a sound control processing program, and etc.) and data (object data, microphone data, and etc.) into the main memory 40 from the optical disk 18 in a step S1. In a succeeding step S3, the sound waveform data necessary for the game is loaded into the SRAM 54.

In a step S5, it is determined whether or not an input is entered. That is, it is determined whether or not there in an input from the controller 22. If "NO" in the step S5, that is, if there is no input from the controller 22, the process directly advances to a step S11 so as to execute an object rendering process, to be exact, a rendering process of an enemy character, and etc. On the other hand, if "YES" in the step S5, that is, there is the input from the controller 22, a movement process of the player character is executed according to the controller input in a step S7. In the game screen 82 as shown in FIG. 7, the player or the user, in a case of changing the location or position of the player character 82, operates the analog joystick (or 3D joystick), out of the operating means 26 (FIG. 1) of the controller 22. Therefore, the CPU 36 receives data of an inclination direction and an inclined amount of the joystick from the controller I/F 56 in the step S7, for example, and based on the data, the location or position of the player character 82 is changed in the world coordinate system.

In a succeeding step S9, a camera process (microphone process) is executed. That is, according to the position of the player character updated in the step S7, the position of the virtual camera (virtual microphone 86) in the world coordinate system is updated. Next, in a step S11, the object rendering process is executed. That is, the CPU 36 converts the position (three-dimensional location) of the above-described player character, the sound object, and etc., into the three-dimensional camera coordinate system in which the virtual camera, that is, the virtual microphone 86 is a reference position (origin position). Then, the three-dimensional camera coordinate system is converted into a two-dimensional projected plain coordinate system, and a designating of the texture, a clipping (clipping: clipping of an invisible world), and etc., are executed in addition thereto. Thereafter, the game image is generated as a result of a generating process of the game image, and the game image is displayed on the monitor 34 (FIG. 1). That is, the CPU 36 applies an instruction to the video I/F 58, and in response to thereto, the video I/F 58 accesses the frame buffer 48 (FIG. 2). Therefore, the image data to be displayed on the monitor 34 is read-out from the frame buffer 48, and the game image (game screen) is displayed.

It is noted that in this example implementation, although detailed descriptions regarding the generating process of the game image are omitted, contents of the descriptions are described in detail in prior-filed Japanese Patent Publication 2002-161148 by the inventor, for example.

In a succeeding step S13, a sound controlling process described in detail later is executed. Next, in a step S15, other game processes are executed. Another game process may include a back-up (save) process of game data occurred as a result of the game being progressed, and etc. In accordance with progress of the game, the game data is written into a work area (not shown) of the main memory 40, and the game data is updated one by one, for example. Then, as a result of the back-up process being executed according to an instruction of the player or the user, or a predetermined event, the game data written in the work area of the main memory 40 is stored into the memory card 30 via the external memory I/F 60 (FIG. 2).

Then, in a step S17, it is determined whether or not to end the game. If "NO" in the step S17, that is, if not to end the game, the process directly returns to the step S5. On the other hand, if "YES" in the step S17, that is, if the game is ended, the game process is directly ended.

Figure 14:
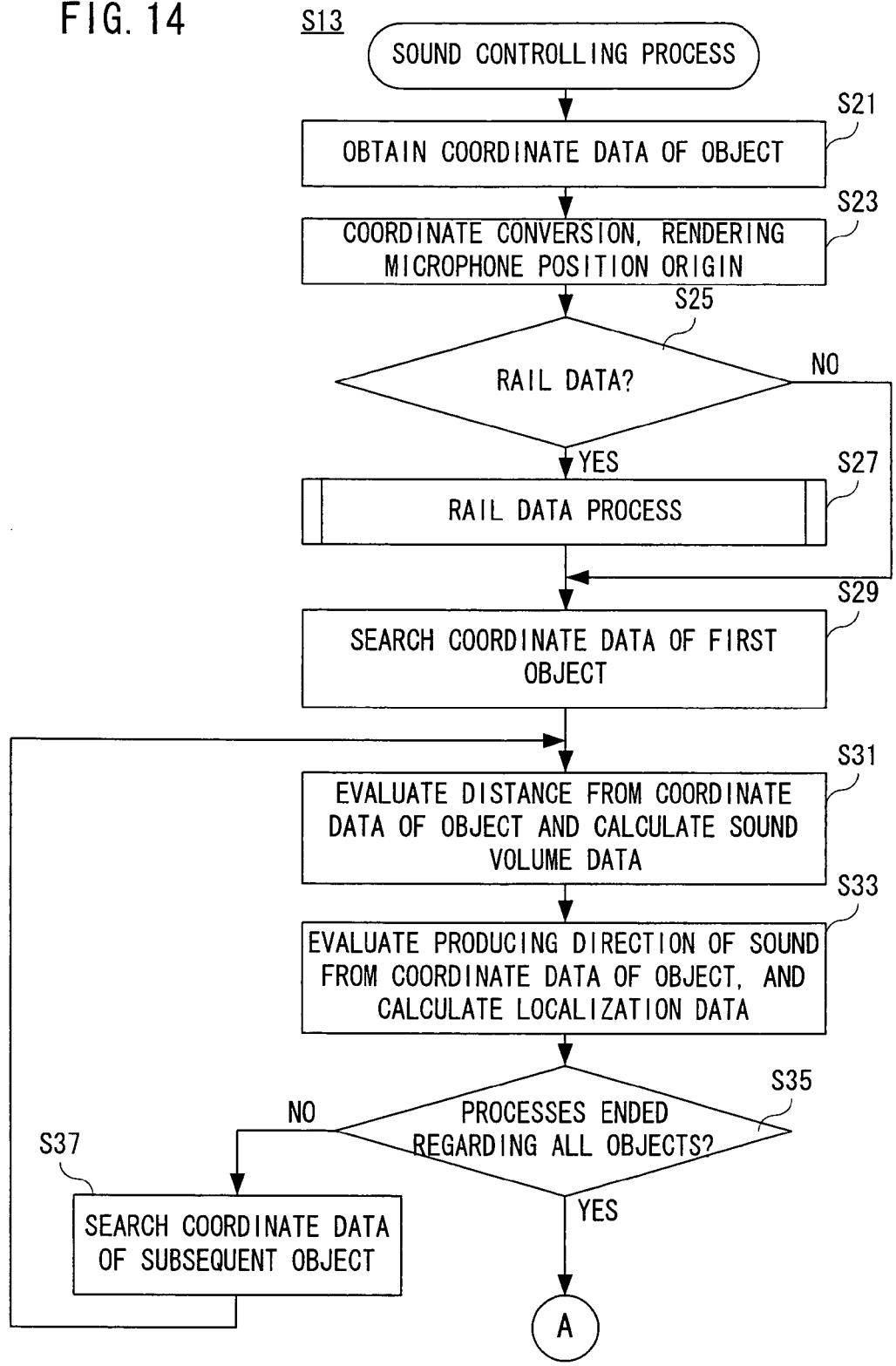
FIG. 14 is a flowchart showing a portion of a sound control process of the CPU shown in FIG. 2.

As shown in FIG. 14, when the sound controlling process is started, the CPU 36 obtains the coordinate data of the object in a step S21. That is, the coordinate data regarding the sound object displayed on the game screen 80 is obtained from the object storing area 72 of the main memory 40 (FIG. 3, FIG. 5). Next, in a step S23, as described using FIG. 9 and FIG. 10, the coordinate conversion is performed while the position of the virtual microphone 86 is assumed as the origin. It is noted that as described above, in the object rendering process in the step S11, a similar coordinate conversion is performed, thus its result may be used.

In a succeeding step S25, it is determined whether or not the coordinate data of the sound object is the rail data. That is, it is determined whether or not a plurality of the coordinate data are written in the object data stored in the object data storing area 72. It is noted that a label indicating a difference between the data of the position of the sound object and the rail data may be attached for each object so as to determine by the label.

If "NO" in the step S25, that is, unless the rail data exists, the process directly advances to a step S29. However, if "YES", that is, if the rail data is available, a rail data process described later in a step S27 is executed, and then, the process advances to the step S29.

In the step S29, the coordinate data of a first object is searched. It is noted that the order of searching the object is arbitrarily determined by the CPU 36. In a succeeding step S31, the distance is evaluated on the basis of the coordinate data of the object according to Equation 1, and using the distance, the sound volume data of the sound allowing the object to be heard is calculated according to Equation 3. Next, in a step S33, using the coordinate data of the object and the distance calculated by Equation 1, a sound-production direction is calculated according to Equation 2. That is, the localization data is calculated. Then, in a step S35, it is determined whether or not a calculating process of the sound volume data and the localization data regarding all the objects is ended.

If "NO" in the step S35, that is, unless the calculating process of the sound volume data and the localization data regarding all the objects is ended, the coordinate data of a subsequent object is searched in a step S37, and then, the process returns to the step S31. On the other hand, if "YES" in the step S35, that is, if the calculating process of the sound volume data and the localization data regarding all the objects is ended, in a step S39 shown in FIG. 15, the objects are classified so as to specify the objects the sound-productions of the sound sources are to be made up one (bringing the sound-productions of the sound sources into one). That is, in a case that a plurality of the sound objects such as the torch exist, or the sound object such as the river exists, the objects that the sound-productions of the sound sources are brought into one is specified in the step S39.

In a succeeding step S41, regarding a first object included in the classification of the specified objects, the sound volume data and the localization data calculated in the steps S31 and S33 are obtained. It is noted that the order of obtaining the object is arbitrarily determined by the CPU 36. In a succeeding step S43, using the obtained sound volume data and the localization data, the L, R, and SR components are calculated. Next, in a step S45, it is determined whether or not all processes are ended regarding the objects to be brought into one. That is, regarding all the objects included in the group of the objects classified in the step S39, it is determined whether or not the L, R, and SR components are calculated.

If "NO" in the step S45, that is, unless the L, R, and SR components regarding all the objects are ended, a subsequent object is searched in a step S47, and then, the process returns to the step S43. On the other hand, if "YES" in the step S45, that is, if the calculation of the L, R, SR components regarding all the objects is ended, respective maximum values are selected from the L, R and SR components regarding all the objects calculated in a step S49.

In a succeeding step S51, the sound volume and the localization are calculated on the basis of the respective maximum values of the selected L, R, SR components. In other words, one virtual sound object is specified, and the sound volume and the localization of the sound object are calculated. Then, in a step S53, based on the sound volume data and the localization data calculated in the step S51, the sound is output. That is, the CPU 36 applies to the DSP 52 an instruction of an output control of the sound, calculates the L, R and SR components from the sound volume data and the localization data, and applies the calculation result to the DSP 52. In response thereto, the DSP 52 reads out the sound waveform data from the SRAM 54, and generates the sound data according to the calculation result of the L, R and SR components. Then, the DSP 52 applies the generated sound data to the audio I/F 62. Consequently, the sound signal converted into an analog signal is output from the speaker 34a.

It is noted that in a case that a plurality of kinds of the objects to be brought into one exist, depending on the number thereof, the processes of the steps S41 to S53 are repeated.

Figure 15:
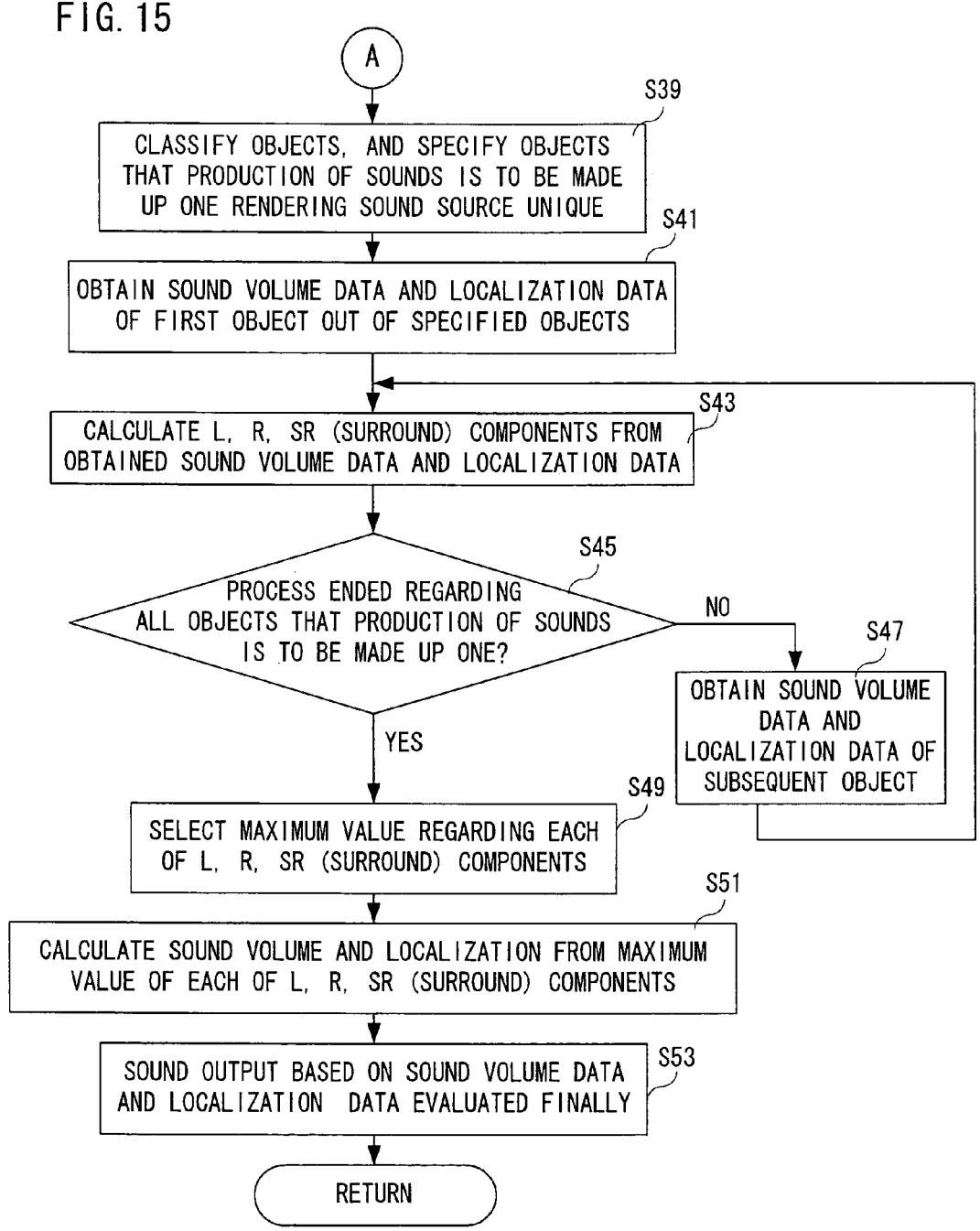
FIG. 15 is a flowchart showing another portion of the sound control process of the CPU shown in FIG. 2.

It is noted that the sound volume data and the localization data once calculated are brought into being corresponded to the three-dimensional coordinate of the virtual camera (virtual microphone 86) in the game world, and stored into the sound output control data storing area 76 of the main memory 40, as described using FIG. 3. A writing process into the main memory 40 may be executed by another game process in the step S15 shown in FIG. 13, for example. Therefore, after the subsequent time, in a case that the virtual microphone 86 exists in the same location or position, the sound control process shown in FIG. 14 and FIG. 15 is not executed, and by referring to the main memory 40, the sound regarding a plurality of the sound objects of the same kind or the sound object requiring the sound-production of a plurality of the sound sources, it is possible to easily output by using only the single sound-production of the sound source.

In addition, in this example, the sound produced by a plurality of the sound objects of the same kind are output by the single sound-production of the sound source so that, after obtaining the maximum values of the L, R and SR components, the sound volume data and the localization data are calculated using the same. However, the obtained maximum values may be directly applied (transferred) to the DSP 52. This, too, allows to bring into one the sound produced by a plurality of the sound objects of the same kind, thus possible to reduce the number of sound-productions of the sound source to be used.

Figure 16:
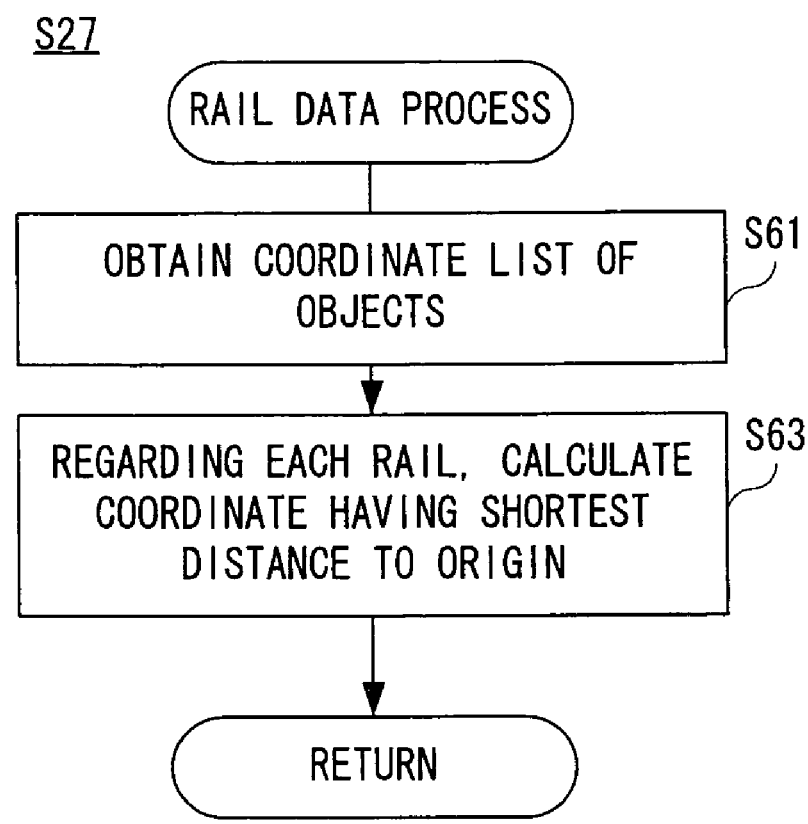
FIG. 16 is a flowchart showing a rail data process of the CPU shown in FIG. 2.

As shown in FIG. 16, once the rail data process is started, a coordinate list of the object is obtained in a step S61. That is, a plurality of three-dimensional coordinate data are obtained. Then, in a step S63, a point at which the distance from each rail to the origin becomes the shortest, that is, a coordinate of the point closest to the origin is calculated. That is, each rail is substituted to the sound object.

It is noted that in the above game process, at a timing that the position of the player character is updated, the sound control process is executed. However, by operating a button switch of the operating means 26 of the controller 22, for example, at a timing that the viewpoint of the virtual camera of the three-dimensional image is changed, via the camera process (microphone process) and the object rendering process, the sound control process may be also executed.

According to one aspect of this example implementation, the sound of a plurality of the objects of the same kind are output by the single sound-production of the sound source so that it is possible to use less resources of the sound source. That is, it is possible to effectively use the sound source. In addition, the sound source is not deleted according to the priority order, thus not deteriorating the liveliness of the game.

It is noted that in this example, in a case that a plurality of the sound objects of the same kind exist, these sound objects are brought into the single sound-production at the sound source, thus using less sound source. However, even in a case that the sound source is used less, when the number of sound-productions of the usable sound source is exceeded, according to the priority order data (see FIG. 5) included in the data of the sound object, the sound of the sound object not to be output is determined. However, as described above, the priority order of the sound object that brings the sound-production of the sound source into one is set high, and the sound is always output.

Furthermore, in this example, in a case that the sound object producing the sound of the same kind exists irrespective of the number of sound-productions of the sound source, these are brought into one. However, only in a case that the number of the sound objects exceeds a predetermined number, the same kind of the sound may be brought into one sound-production of the sound source.

Furthermore, in this example, descriptions are only given to the video game apparatus as shown in FIG. 1. However, it is needless to say that the illustrative exemplary non-limiting implementations disclosed herein are applicable to another game apparatus or a portable game machine or a DVD player, and etc., that produce the sound produced by the sound object displayed on the monitor by a sound processor such as the DSP using the sound waveform data.

Still furthermore, in this example, a case of being provided with only right and left speakers, or a case of being further provided with the surround speaker is described. However, two speakers are sufficient if capable of outputting the sound at least in two directions. In addition, four or more speakers may be provided. Furthermore, in a case of calculating the component of the sound volume, as shown in the above embodiment, it is desirable to calculate according to the number of the speakers.

Furthermore, in this example, only the torch, the river and, the wave sound objects are described. However, sound objects are not necessary limited to these example alone.

Although the present invention illustrative exemplary non-limiting implementations disclosed herein have been described and illustrated in detail, it is clearly understood that the same is by way of illustration and example only and is not to be taken by way of limitation, the spirit and scope of applicants' invention being limited only by the terms of the appended claims.

What is claimed is:

1. In a computer controlled game apparatus which includes a mechanism for inputting game operating information by a human player, a memory for storing data for displaying objects constituting a game image, an image display control for displaying the game image including at least two of said objects based on said operating information, said at least two objects constituting said game image each being a sound object that produces a sound, a waveform data storage memory for storing one or more sets of waveform data corresponding to one or more sounds produced by one or more sound objects, a sound producing position storage memory for storing sound producing position data indicating a producing position of the sound for each said sound object, and a microphone data storage memory for storing microphone data including sound collecting position data indicating a position at which a sound is to be collected during game play, a computer game sound control program product embodied on a computer-readable medium for distribution and/or storage on a computer controlled game apparatus, comprising:

program instruction means for computing sound volume data of sounds respectively produced by said sound objects based on both said sound producing position data and said microphone data;

program instruction means for dividing the sound volume data into sound volume component data corresponding to at least two directions;

program instruction means for classifying, out of all said sound objects, the sound objects which produce an identical sound; and program instruction means for extracting a maximum sound volume component of said component data corresponding to two directions associated with a sound object producing said same sound and outputting the sound based on the waveform data of the object and said maximum sound volume component data of each component.

2. A computer game sound control program product according to claim 1, further comprising:

sound producing program instructions for computing localization data and the sound volume data of the sound to be output based on said maximum sound volume component data.

3. A computer game sound control program product according to claim 1, wherein said microphone data further includes sound-collection direction data indicating a direction from which the sound is to be collected during the game, and said program instruction means for dividing sound volume data divides, based on said sound producing position data and said sound-collection direction data, the sound volume data of a sound object into right sound volume data, left sound volume data, and surround sound volume data.

4. A computer game sound control program product according to claim 3, further comprising object sound localization calculation instruction means for computing a localization of one sound based on the sounds of at least said two sound objects from said sound producing position data and said microphone data; wherein said program instruction means for dividing sound volume data divides said sound volume data of sound object into the right sound volume data, the left sound volume data, and the surround sound volume data based on the localization of the sound calculated by said object sound localization calculating program.

5. A computer game sound control program product according to claim 3, wherein said sound producing position data includes position data of a sound object represented by one coordinate data, and position data of the sound object having rail data defined by at least two coordinate data; further comprising near coordinate calculating program instruction means for calculating coordinate data existing on a line connecting the coordinates indicating said rail data and most close to said sound collecting position data regarding the sound object having said rail data; wherein said program instruction means for computing sound volume data computes the sound volume data of the sound object on the basis of the coordinate data computed by said near coordinate calculating program instruction means and said sound volume position data when computing the sound volume data of the sound object having said rail data, said program instruction means for dividing sound volume component data divides the sound volume data on the basis of the coordinate data computed by said near coordinate calculating program instruction means and said sound collecting position data, into the right sound volume data, the left sound volume data, and the surround sound volume data.

6. In a game apparatus that comprises a CPU, a mechanism for inputting game operating information, a memory for storing data for displaying objects constituting a game image, said game image comprising one or more game objects based on said operating information wherein at least two of said game objects constituting said game image are sound objects that produce a sound during game play, a memory for storing waveform data corresponding to sounds produced by one or more sound objects a memory for storing sound producing position data indicating a producing position of sound for a sound object, and a memory for storing microphone data comprising sound collecting position data for indicating a position at which a sound is to be collected during game play, a method for generating game sounds, comprising the steps performed by said CPU, of:

(a) computing sound volume data of sounds respectively generated by said sound objects on the basis of both said sound producing position data and said microphone data;

(b) dividing the sound volume data computed by said step (a) into said sound volume component data corresponding to at least two different directions;

(c) identifying, out of all said sound objects, objects producing the same sound; and (d) extracting a maximum sound volume component data for each component of said at least two directions associated with each said object producing the same sound, and outputting the sound based on the waveform data corresponding to said objects producing the game sound and the maximum sound volume component data of said each component.

7. A method for generating game sound according to claim 6, wherein
said extracting step includes computing localization data and sound volume data of the sound output based on said maximum sound volume component data.

8. A method for generating game sound according to claim 6, wherein
said microphone data further includes sound-collection direction data indicating a direction at which the sound is collected during game play,
said dividing step divides the sound volume data of said sound object volume from said sound producing position data and said sound-collection direction data into right sound volume data, left sound volume data, and surround sound volume data.

9. A method for generating game sound according to claim 8, further comprising:
(e) computing a localization of one sound from said sound producing position data and said microphone data based on the sound of said sound objects; wherein
said dividing step divides said sound volume data of said sound object volume based on a computed localization into the right sound volume data, the left sound volume data, and the surround sound volume data.

10. A method for generating game sound according to claim 8, wherein
said sound producing position data includes rail data sound source position data represented by point sound source position data represented by one coordinate data, and the rail data defined by at least two coordinate data; further comprising a step of:
(f) computing coordinate data of a location most close to said sound collecting position data regarding the sound object having said rail data existing on a line connecting coordinates indicating said rail data; wherein
said computing step computes the sound volume data of the sound object from computed coordinate data and said sound volume position data when computing the sound volume data of a sound object having said rail data, and
said dividing step divides the sound volume data into right sound volume data, left sound volume data, and surround sound volume data, respectively, on the basis of coordinate data calculated by said near coordinate calculation instructions and said sound collecting position data.

11. A video game apparatus capable of displaying a plurality of game objects and producing sounds associated with a plurality of sound generating objects, comprising:
a storage memory for storing sound waveform data corresponding to sounds associated with a plurality of sound generating objects;
a storage memory for storing sound producing position data indicating a producing position of the sound for each said sound generating object;
a storage memory for storing microphone data including sound collecting position data for indicating one or more positions at which sound is collected during game play;
a sound volume calculator wherein sound volume data for one or more sound generating objects is computed based on said sound producing position data and said microphone data;
a sound volume component divider wherein the sound volume data computed by said sound volume data calculator is resolved into sound volume component data corresponding to two or more directions;
a sound output mechanism which outputs audio sounds on said waveform data and said sound volume component data;
a sound generating object classify or that identifies, out of all said sound objects, which sound generating objects produce the same sound; and
a sound volume component extractor which resolves a maximum sound volume component data for each component of said two or more directions associated with each object that produces said same sound and which provides the waveform data of the sound generating object and the maximum sound volume component data of said each component to the sound output mechanism.

12. A video game apparatus according to claim 11, wherein
said sound output mechanism includes a sound volume calculator for computing the localization data and the sound volume data of the sound output based on said maximum sound volume component data.

13. A video game apparatus according to claim 11, wherein
said microphone data further includes the sound collecting direction data indicating a direction at which the sound is to be collected during game play,
said sound volume component divider divides the sound volume data of said sound object from said sound producing position data and said sound-collection direction data into right sound volume data, left sound volume data, and surround sound volume data.

14. A video game apparatus according to claim 13, further comprising
an object sound localizer which computes a localization of a sound based on the sound of two or more sound objects from said sound producing position data and said microphone data; wherein
said sound volume component divider divides said sound volume data of said sound object based on a computed localization of the sound into the right sound volume data, the left sound volume data, and the surround sound volume data.

15. A video game apparatus according to claim 13, wherein
said sound producing position data includes position data of a sound object having rail data represented by sound object position data represented by single coordinate data and rail data represented by multiple coordinate data; further comprising
a near coordinate calculating mechanism for computing the coordinate data existing on a line connecting coordinates indicating said rail data, and in a position most close to said sound collecting position data stored in said microphone data storing means regarding the sound object having said rail data; wherein
said sound volume data calculator computes the sound volume data of the sound object on the basis of the coordinate data computed by said near coordinate calculator and said sound volume position data when computing the sound volume data of the sound object having said rail data,
said sound volume component divider divides the sound volume data on the basis of the coordinate data computed by said near coordinate calculator and said sound collecting position data into the right sound volume data, the left sound volume data, and the surround sound volume data.

16. A method for producing sounds associated with a plurality of displayable objects in a video game apparatus, comprising:

storing sound waveforms data;

storing sound production position data;

storing sound collection position data;

associating sound waveform data with one or more displayable objects;

computing sound volume data for two or more sound generating displayable objects based on the sound producing position data and the sound collection position data;

resolving sound volume data for said two or more sound generating displayable objects into sound component data comprising two or more directional components; and outputting sound data for two or more of said displayable objects based on waveform data associated with each said displayable object and one or more directional components of computed sound volume data of said displayable objects;

wherein said video game apparatus includes and/or accepts memory storage devices for storing sound related data and a processor for computing and resolving sound volume data.

17. The method of claim 16 further comprising:

identifying sound generating objects, out of said plurality of sound generating objects, that are associated with a same sound waveform;

selecting volume component data corresponding to the maximum directional components of said sound volume component of each of said plurality of sound generating object; and associating selected maximum sound volume component with corresponding waveform data for each of said plurality of objects.

* * * * *